United States Patent
Boivin et al.

(10) Patent No.: US 12,162,539 B2
(45) Date of Patent: Dec. 10, 2024

(54) AERODYNAMIC SKIRT SECURING CONNECTOR COMPRISING A STABILIZER

(71) Applicant: TRANSTEX INC., Montréal (CA)

(72) Inventors: Mathieu Boivin, Montreal (CA); Walid Deir, Lachine (CA); George Bassily, Laval (CA); Swaroop Mulenahalli Kantharaju, Montreal (CA); Elizabeth Tome, St-Leonard (CA); Sylvain Daoust, Vaudreuil-Dorion (CA); Ali Fellah Jahromi, Saint-Laurent (CA)

(73) Assignee: Transtex Inc., Saint-Laurent (CA)

( * ) Notice: Subject to any disclaimer, the term of this patent is extended or adjusted under 35 U.S.C. 154(b) by 0 days.

(21) Appl. No.: 18/377,771

(22) Filed: Oct. 7, 2023

(65) Prior Publication Data

US 2024/0034420 A1   Feb. 1, 2024

Related U.S. Application Data

(63) Continuation of application No. 17/892,928, filed on Aug. 22, 2022, now Pat. No. 11,780,510, which is a continuation of application No. 16/832,678, filed on Mar. 27, 2020, now Pat. No. 11,420,690, which is a continuation of application No. 16/531,317, filed on Aug. 5, 2019, now Pat. No. 10,640,156, which is a continuation of application No. 15/257,571, filed on Sep. 6, 2016, now Pat. No. 10,414,448.

(60) Provisional application No. 62/314,082, filed on Mar. 28, 2016, provisional application No. 62/215,129, filed on Sep. 7, 2015.

(51) Int. Cl.
*B62D 35/00* (2006.01)

(52) U.S. Cl.
CPC ................... *B62D 35/001* (2013.01)

(58) Field of Classification Search
None
See application file for complete search history.

(56) References Cited

U.S. PATENT DOCUMENTS

| | | | |
|---|---|---|---|
| 8,186,745 B2 * | 5/2012 | Graham | B62D 35/02 296/180.1 |
| 10,414,448 B2 * | 9/2019 | Boivin | B62D 35/001 |
| 10,640,156 B2 * | 5/2020 | Boivin | B62D 35/001 |
| 2012/0091754 A1 * | 4/2012 | Lee | B62D 35/001 296/180.4 |

(Continued)

*Primary Examiner* — Joseph D. Pape
(74) *Attorney, Agent, or Firm* — Benoit & Cote Inc.; Mathieu Audet

(57) ABSTRACT

A strut member to be secured to the floor structure includes a top skirt-contacting portion for the aerodynamic skirt panel to be secured thereto, a lower skirt-contacting portion for the aerodynamic skirt panel to be secured thereto distant from the top skirt-contact portion, and a strut portion connecting the top skirt-contact portion to the lower skirt-contacting portion. The strut member provides a clearance in which the skirt panel is free of contact with the strut member between the top skirt-contact portion and the lower skirt-contacting portion. The strut portion is configured to resiliently buckle between a buckled position upon the skirt panel undergoing a force exceeding a threshold value toward the strut member and an original position when no force is applied and when the skirt panel is undergoing a force that is less than the threshold value.

17 Claims, 41 Drawing Sheets

(56) References Cited

U.S. PATENT DOCUMENTS

2014/0300134 A1* 10/2014 Gerst .................. B62D 35/001
                                                                  296/180.4
2014/0353443 A1* 12/2014 Kuo .................... B62D 35/001
                                                                  248/201

* cited by examiner (SECTION OF PLANE OF FIG. 33)

AERODYNAMIC SKIRT SECURING CONNECTOR COMPRISING A STABILIZER

CROSS-REFERENCE TO RELATED APPLICATIONS

The present application relates to and is a continuation application claiming priority under 35 U.S.C. § 119(a) from U.S. patent application Ser. No. 17/892,928, filed Aug. 22, 2022, entitled AERODYNAMIC SKIRT SECURING CONNECTOR COMPRISING A STABILIZER, which relates to and is a continuation application claiming priority under 35 U.S.C. § 119(a) from U.S. patent application Ser. No. 16/832,678, filed Mar. 27, 2020, entitled AERODYNAMIC SKIRT SECURING CONNECTOR WITH ANGULAR ASSEMBLY CAPABILITY, which relates to and is a continuation application claiming priority under 35 U.S.C. § 119(a) from U.S. patent application Ser. No. 16/531,317, files Sep. 6, 2016, entitled STRUT PORTION WITH BUCKLING CAPABILITY FOR AERODYNAMIC SKIRT, which relates to and is a continuation application claiming priority under 35 U.S.C. § 119(a) from U.S. patent application Ser. No. 15/257,571, filed Sep. 6, 2016 under 35 U.S.C. § 111, entitled SUPPORT SYSTEM FOR AERODYNAMIC SKIRT ASSEMBLY AND METHOD OF INSTALLATION THEREOF, which relates to and is a non-provisional application claiming priority under 35 U.S.C. § 119(e) from U.S. Provisional Patent Application No. 62/215,129, filed Sep. 7, 2015 under U.S.C. § 111, entitled SUPPORT SYSTEM FOR AERODYNAMIC SKIRT ASSEMBLY AND METHOD OF INSTALLATION THEREOF and also relates to and is a non-provisional application claiming priority under 35 U.S.C. § 119(e) from U.S. Provisional Patent Application No. 62/314,082, filed Mar. 28, 2016 under 35 U.S.C. § 111, entitled SELF-REPOSITIONING STRUT PORTION FOR AERODYNAMIC SKIRT, which are incorporated herein by reference in their entireties.

BACKGROUND

(a) Field

This invention generally relates to a strut for aerodynamic skirt. More precisely, the invention relates to a self-repositioning strut for securing an aerodynamic skirt to a vehicle to improve the aerodynamic efficiency of the vehicle.

(b) Related Prior Art

Road tractors are used to pull semi-trailers on roads to transport cargo. Aerodynamic apparatuses are installed on the road tractor and/or on the semi-trailer in order to reduce the aerodynamic air drag and improve fuel efficiency.

Trailer skirts made of rigid materials are installed on both lateral sides of a road trailer to help manage the flow of air around and underneath the trailer. Brackets, also made of rigid material, are affixed to the trailer to secure the skirts positioned thereto. These aerodynamic skirts are secured to the bottom portion of the trailer, or to the sides of the trailer's floor, to ensure proper positioning when the vehicle is moving.

People who are familiar with the trucking industry know that trailers are built in various configurations. Frame assembly of trailer can use members and beams of different dimensions. For example, an I-beam, that is commonly used in trailer manufacturing, also known as H-beam, W-beam (for "wide flange"), Universal Beam (UB), Rolled Steel Joist (RSJ), or double-T, is a beam with an I or H-shaped cross-section. The horizontal elements of the "I" are known as flanges, while the vertical element is termed the "web". I-beams are usually made of structural steel, or aluminum, and are used in construction and civil engineering. The web resists shear forces, while the flanges resist most of the bending moment experienced by the beam. Beam theory shows that the I-shaped section is a very efficient form for carrying both bending and shear loads in the plane of the web. An adaptable securing mechanism is hence desirable to adapt to a range of I-beam dimensions.

The skirts, because of their position under the trailer's floor and their proximity with the road, are significantly vulnerable and might easily enter in contact with surrounding obstacles. Portions of the securing mechanism holding the skirts, when put under significant stress, plastically bend and/or break to effect the skirts' position in respect to the road trailer thus reducing the efficiency of the skirts. Additionally, the assembly can be crooked or not precisely aligned, which is causing additional challenges to secure the aerodynamic skirt assembly to the vehicle.

Aerodynamic skirt assemblies in the art are complex to install given the many adjustments required to match the precise configuration of each trailer. The number of parts required to secure the strut to the trailer is generally significant and time consuming to assemble. Also, the weight of the skirt assembly is important to prevent unduly adding weight to the trailer and hence increase its fuel consumption.

Skirt supporting struts in the art have a linear deflection rate that is proportional to the force applied thereto. The struts need to be rigid enough to remain in their operating position and channel efficiently air around the trailer. This required rigidity is significant and is detrimental to proper flexing of the skirt assembly when contacting a foreign object.

Therefore, there exists a need in the art for an improved aerodynamic skirt assembly over the existing art. There is a need in the art for an improved skirt-securing strut adapted to recover its original shape after contacting a foreign object. There is also a need for a skirt-securing strut that can flex, can be economically manufactured and easily installed.

SUMMARY

In some aspects, the techniques described herein relate to a strut member for securing an aerodynamic skit panel thereto and to be mounted to a floor structure of a trailer, the strut member including: a connector portion including a trailer-contacting portion configured to butt up against the floor structure; a first skirt-contacting portion joined to the connector portion, the first skirt-contacting portion being configured for the aerodynamic skirt panel to be secured thereto; a substantially linear strut portion joined to the connector portion distant to the first skirt-contacting portion, thereby defining a projection at the strut contacting portion; and a stabilizer joined to the trailer-contacting portion, the stabilizer extending farther from the first skirt-contacting portion than the projection of the strut portion, wherein the strut member is configured to be mounted through the connector portion to the floor structure in-between the skirt-contacting portion and the stabilizer.

In some aspects, the techniques described herein relate to a strut member, wherein the trailer-contacting portion includes a surface configured for a securing mechanism to butt up against toward the floor structure to mount the strut member to the floor structure.

In some aspects, the techniques described herein relate to a strut member, wherein the trailer-contacting portion includes openings providing passage to a portion of the securing mechanism to extend therethrough.

In some aspects, the techniques described herein relate to a strut member, wherein the stabilizer is wider than the distance between the openings perpendicular to a central vertical plane of the strut member.

In some aspects, the techniques described herein relate to a strut member, wherein the openings do not extend through the stabilizer.

In some aspects, the techniques described herein relate to a strut member, wherein the connector portion is tapered toward the stabilizer.

In some aspects, the techniques described herein relate to a strut member, wherein the first skirt-contacting portion includes a pair of wings that extend in opposed direction to the trailer-contacting portion.

In some aspects, the techniques described herein relate to a strut member, wherein the strut portion includes, distant to the securing portion, a second skirt-contacting portion adapted for the aerodynamic skirt panel to be secured thereto.

In some aspects, the techniques described herein relate to a strut member, wherein the securing portion and the strut portion define together a concave structure providing clearance between the strut member and the aerodynamic skirt panel to be secured thereto.

In some aspects, the techniques described herein relate to a strut member, wherein the strut portion extends at an angle of between 60 degrees and 80 degrees relative to the trailer-contacting portion toward the first skirt-contacting portion.

In some aspects, the techniques described herein relate to a strut member, wherein the securing portion includes alignment guided configured to extend beyond the trailer-contacting portion.

In some aspects, the techniques described herein relate to a skirt securing connector assembly for securing an aerodynamic skit panel thereto and to be mounted to an I-beam of a trailer, the skirt securing connector assembly including: a strut member including: a connector portion including a trailer-contacting portion configured to butt up against the I-beam; a first skirt-contacting portion configured for the aerodynamic skirt panel to be secured thereto; a substantially linear strut portion joined to the connector portion distant to the first skirt-contacting portion, thereby defining a projection at the strut contacting portion; and a stabilizer joined to the trailer-contacting portion, the stabilizer extending farther from the first skirt-contacting portion than the projection of the strut portion; and a securing mechanism configured to mount the strut member to the I-beam of the trailer, wherein the strut member is configured to be mounted through the connector portion to the I-beam in-between the first skirt-contacting portion and the stabilizer.

In some aspects, the techniques described herein relate to a skirt securing connector assembly, wherein the trailer-contacting portion includes a surface configured for a securing mechanism to butt up against toward the I-beam to mount the strut member to the I-beam.

In some aspects, the techniques described herein relate to a skirt securing connector assembly, wherein the trailer-contacting portion includes openings providing passage to a portion of the securing mechanism to extend therethrough.

In some aspects, the techniques described herein relate to a skirt securing connector assembly, wherein the stabilizer is wider than the distance between the openings perpendicular to a central vertical plane of the strut member.

In some aspects, the techniques described herein relate to a skirt securing connector assembly, wherein the openings do not extend through the stabilizer.

In some aspects, the techniques described herein relate to a skirt securing connector assembly, wherein the securing mechanism is adapted to clamp the I-beam.

In some aspects, the techniques described herein relate to a skirt securing connector assembly, wherein the strut portion includes, distant to the securing portion, a second skirt-contacting portion adapted for the aerodynamic skirt panel to be secured thereto.

In some aspects, the techniques described herein relate to a skirt securing connector assembly, wherein the securing portion and the strut portion define a concave structure providing clearance between the skirt securing connector and the aerodynamic skirt panel to be secured thereto.

In some aspects, the techniques described herein relate to a skirt securing connector assembly, wherein the strut portion extends at an angle of between 60 degrees and 80 degrees relative to the trailer-contacting portion toward the first skirt-contacting portion.

Furthermore, in some aspects, the techniques described herein relate to a strut member for securing an aerodynamic skirt panel thereto and to be mounted to a floor structure of a vehicle, the strut member including: a vehicle-contacting portion to be secured to the floor structure; a top skirt-contacting portion for the aerodynamic skirt panel to be secured thereto; a lower skirt-contacting portion for the aerodynamic skirt panel to be secured thereto distant from the top skirt-contact portion; and a strut portion connecting the top skirt-contact portion to the lower skirt-contacting portion, wherein the strut member provides a clearance in which the skirt panel is free of contact with the strut member between the top skirt-contact portion and the lower skirt-contacting portion, and wherein the strut portion is configured to resiliently buckle between a buckled position upon the skirt panel undergoing a force exceeding a threshold value toward the strut member and an original position when no force is applied and when the skirt panel is undergoing a force that is less than the threshold value.

In some aspects, the techniques described herein relate to a strut member, wherein the strut portion includes a first segment having a concave portion facing the aerodynamic skirt panel when assembled to the aerodynamic skirt panel.

In some aspects, the techniques described herein relate to a strut member, wherein the strut portion includes a portion that is non parallel to the aerodynamic skirt panel when operatively secured thereto.

In some aspects, the techniques described herein relate to a strut member, wherein the strut portion includes a first segment having two co-planar edges and a curved portion connecting the two co-planar edges.

In some aspects, the techniques described herein relate to a strut member, wherein the top skirt-contacting portion and the lower skirt-contacting portion include co-planar surfaces.

In some aspects, the techniques described herein relate to a strut member, wherein the strut member resiliently buckles when a force of less than 600 Newtons is applied thereto.

In some aspects, the techniques described herein relate to a strut member, wherein the strut member resiliently buckles when a force of between about 400 Newtons and about 600 Newtons is applied thereto.

In some aspects, the techniques described herein relate to a strut member, wherein the lower skirt-contacting portion is for the aerodynamic skirt panel to be non-slidingly secured thereto.

In some aspects, the techniques described herein relate to a strut member, wherein the strut member has a length, and wherein the first segment extends over at least 30 percent of the strut portion.

In some aspects, the techniques described herein relate to a strut member, wherein the strut portion next to the top skirt-contacting portion and next to the lower skirt-contacting portion has a constant width.

In some aspects, the techniques described herein relate to a strut member, wherein the vehicle is a trailer.

In some aspects, the techniques described herein relate to a strut member for securing an aerodynamic skirt panel thereto and to be mounted to a floor structure of a vehicle, the strut member including: a vehicle-contacting portion to be secured to the floor structure; a top skirt-contacting portion for the aerodynamic skirt panel to be secured thereto; a lower skirt-contacting portion for the aerodynamic skirt panel to be secured thereto distant from the top skirt-contacting portion; and a strut portion connecting the top skirt-contacting portion to the lower skirt-contacting portion, the strut portion including a first segment featuring a concave skirt-facing face adapted to resiliently buckle between a buckled position upon the skirt panel undergoing a force exceeding a threshold value toward the strut member and an original position when no force is applied and when the skirt panel is undergoing a force that is less than the threshold value.

In some aspects, the techniques described herein relate to a strut member, wherein the first segment of the strut portion is contact-free from the skirt panel when the skirt panel is mounted to the strut member.

In some aspects, the techniques described herein relate to a strut member, wherein the first segment further includes a convex face that is for facing in a direction opposed to the aerodynamic skirt panel.

In some aspects, the techniques described herein relate to a strut member, wherein the strut member provides a clearance in which the skirt panel is free of contact with the strut member between the top skirt-contact portion and the lower skirt-contacting portion.

In some aspects, the techniques described herein relate to a strut member, wherein the top skirt-contacting portion and the lower skirt-contacting portion include co-planar surfaces.

In some aspects, the techniques described herein relate to a strut member, wherein the strut member resiliently buckles when a force of less than 600 Newtons is applied thereto.

In some aspects, the techniques described herein relate to a strut member, wherein the lower skirt-contacting portion is for the aerodynamic skirt panel to be non-slidingly secured thereto.

In some aspects, the techniques described herein relate to a strut member, wherein the strut member has a length, and wherein the first segment extends over at least 30 percent of the strut portion.

In some aspects, the techniques described herein relate to a strut member, wherein the strut portion next to the top skirt-contacting portion and next to the lower skirt-contacting portion has a constant width.

Other embodiments and further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Additional and/or alternative advantages and salient features of the invention will become apparent from the following detailed description, which, taken in conjunction with the annexed drawings, disclose preferred embodiments of the invention.

BRIEF DESCRIPTION OF THE DRAWINGS

Referring now to the drawings which form a part of this original disclosure.

DETAILED DESCRIPTION OF PREFERRED EMBODIMENTS

Figure 1:
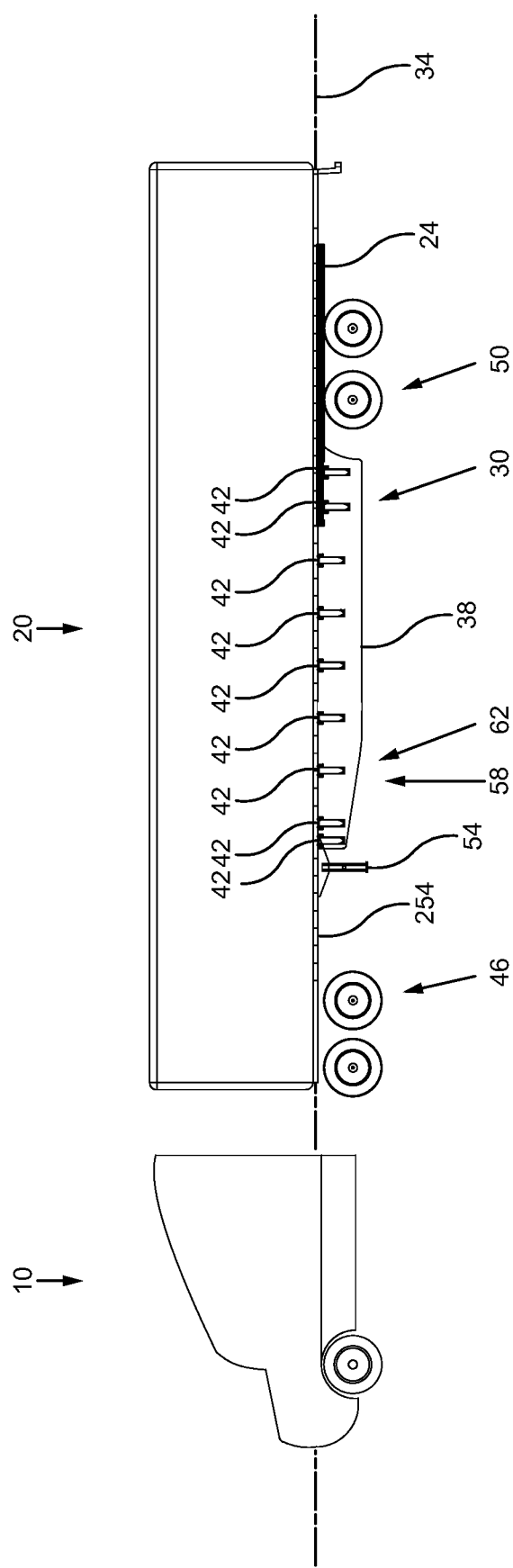
FIG. 1 is a side elevation view of a vehicle with a trailer in accordance with at least one embodiment of the invention.
Figure 2:
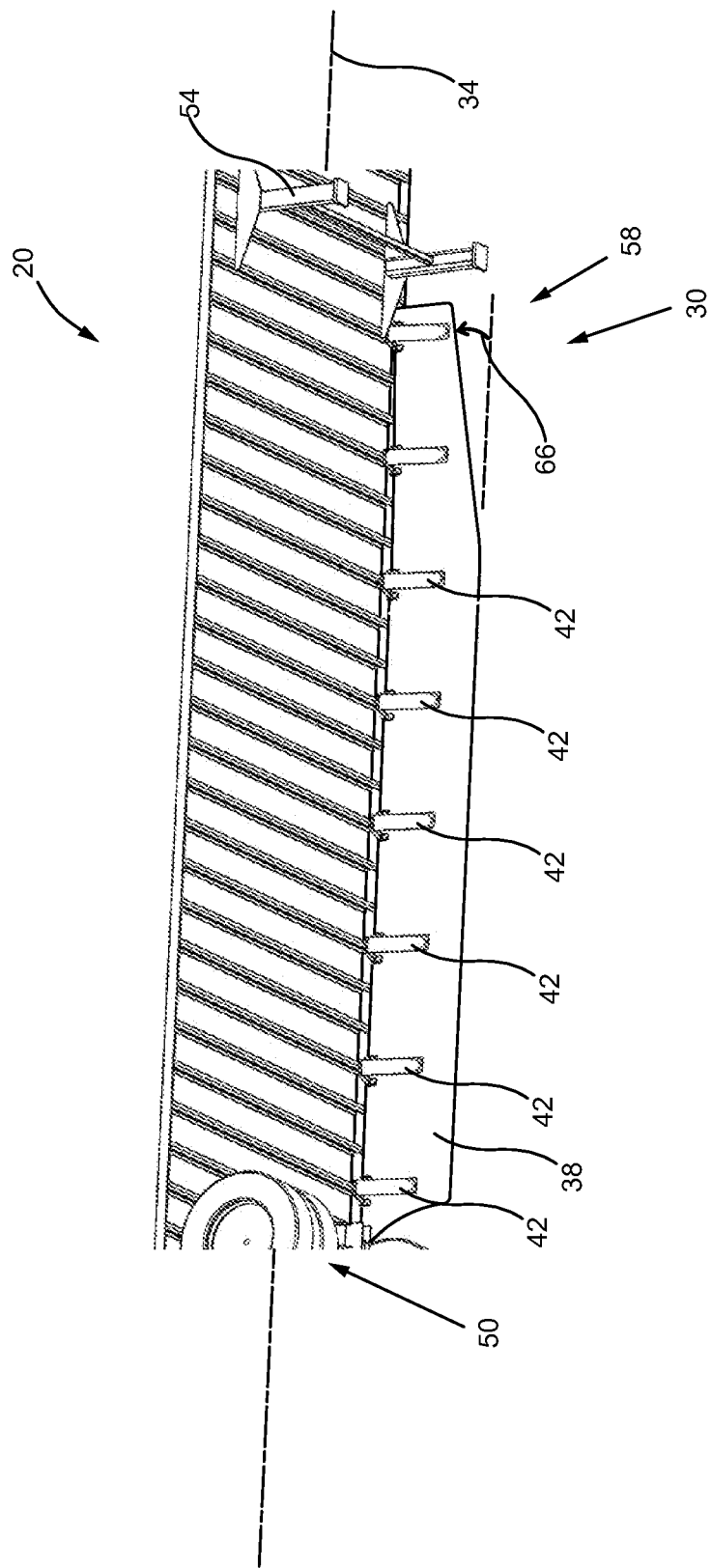
FIG. 2 is a side elevation view of a portion of a trailer in accordance with at least one embodiment of the invention.
Figure 3:
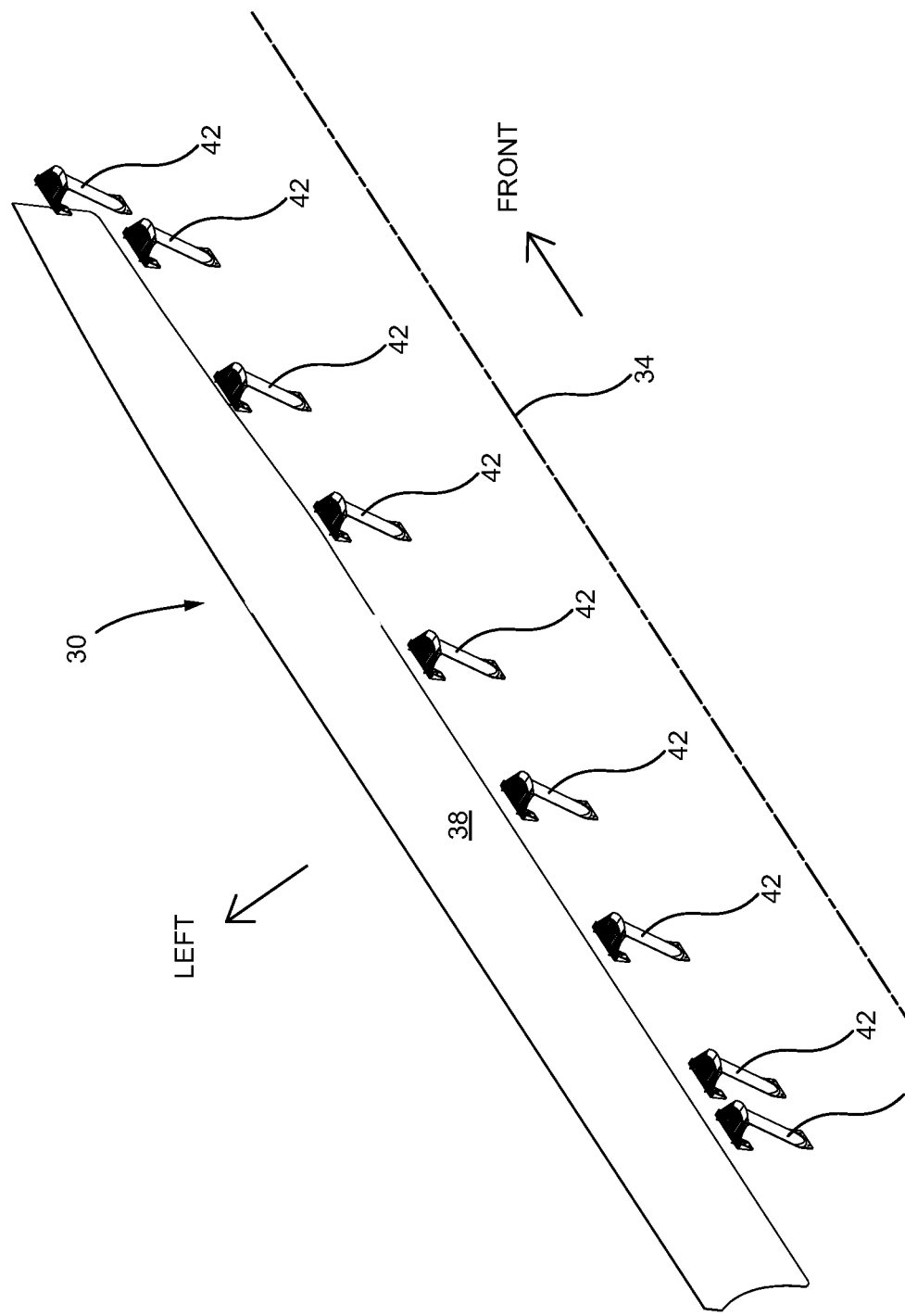
FIG. 3 is an isometric exploded view of an aerodynamic skirt in accordance with at least one embodiment of the invention.

A preferred embodiment of the present invention is described below with reference to the drawings. FIG. 1, FIG. 2 and FIG. 3 illustrate a road tractor 10 with a trailer 20 attached thereto equipped with a pair of skirt assemblies 30, installed on each side of the trailer 20 along a longitudinal axis 34, adapted to deflect and direct the airflow around the trailer 20. Each aerodynamic skirt assembly 30 includes a skirt panel 38, adapted to be disposed on the side of the trailer 20, and a plurality of securing mechanisms 42 adapted to secure the skirt panel 38 to the trailer 20. The securing mechanisms 42 are visible although not clearly illustrated in FIG. 1, FIG. 2 and FIG. 3 and will be discussed in more details below. Once installed on the trailer 20, the skirt assembly 30 helps channel the flow of air around the trailer 20 to reduce the air drag of the vehicle when the trailer 20 moves on the road, pulled by the road tractor 10. One can appreciate from FIG. 1 that the trailer 20 includes slider rail 24 used to adjust the location of the set of wheels 50 on the trailer 20, thus interacting with the length of the skirt panel 38.

The skirt assembly 30 of the present embodiment is mostly located under the trailer 20, between the wheels 46 of the road tractor 10 and the wheels 50 of the trailer 20. The skirt panels 38 can alternatively extend forward up to the trailer supports 54, also known as landing gears, and be secured thereto thus preventing complex skirt panel 38 arrangements through the securing mechanism 42. The skirt panels 38 are substantially vertically positioned on each side of the trailer 20, preferably located as a vertical continuity of the trailer's side/wall, with a clearance with the ground by illustratively about 15-25 centimeters (about 6 to 12 inches). The air management around the trailer 20 provided by the skirt assembly 30 reduces the air drag created by the trailer 20 by directing the flow of air around the trailer 20. The flow of air would otherwise turbulently move around and below the trailer 20 to create substantial air drag. The airflow management around the trailer 20 provided by the skirt assembly 30 helps maintain laminar airflow around the trailer 20 that diminishes fuel consumption of the road tractor 10. The skirt assembly 30 also improves the safety of the vehicle by providing a barrier that can substantially restrict objects to get under the trailer 20.

As illustrated, the skirt panel 38 is shaped with an optional progressive height 62 from a front portion 58 thereof. The skirt panels 38 can alternatively also be installed at an angle, in respect to the vertical (not illustrated), on the trailer 20 to change the airflow pattern around the trailer 20 and more precisely adjust the aerodynamics to a specific vehicle shape.

It can be appreciated in FIG. 2 that each skirt panel 38 is installed directly on the side of the trailer 20 and, when seen from above, the front portion 58 that optionally progressively proximally leans angle 66 toward the center 34 of the trailer 20. The recessed front portion 58 of the skirt panel 38 improves the management of turbulent airflow generated by the road tractor 10 thus improving the aerodynamic efficiency of the skirt assembly 30. Additional explanation about the shape of the skirt panel 38 will be provided in further details below.

Figure 4:
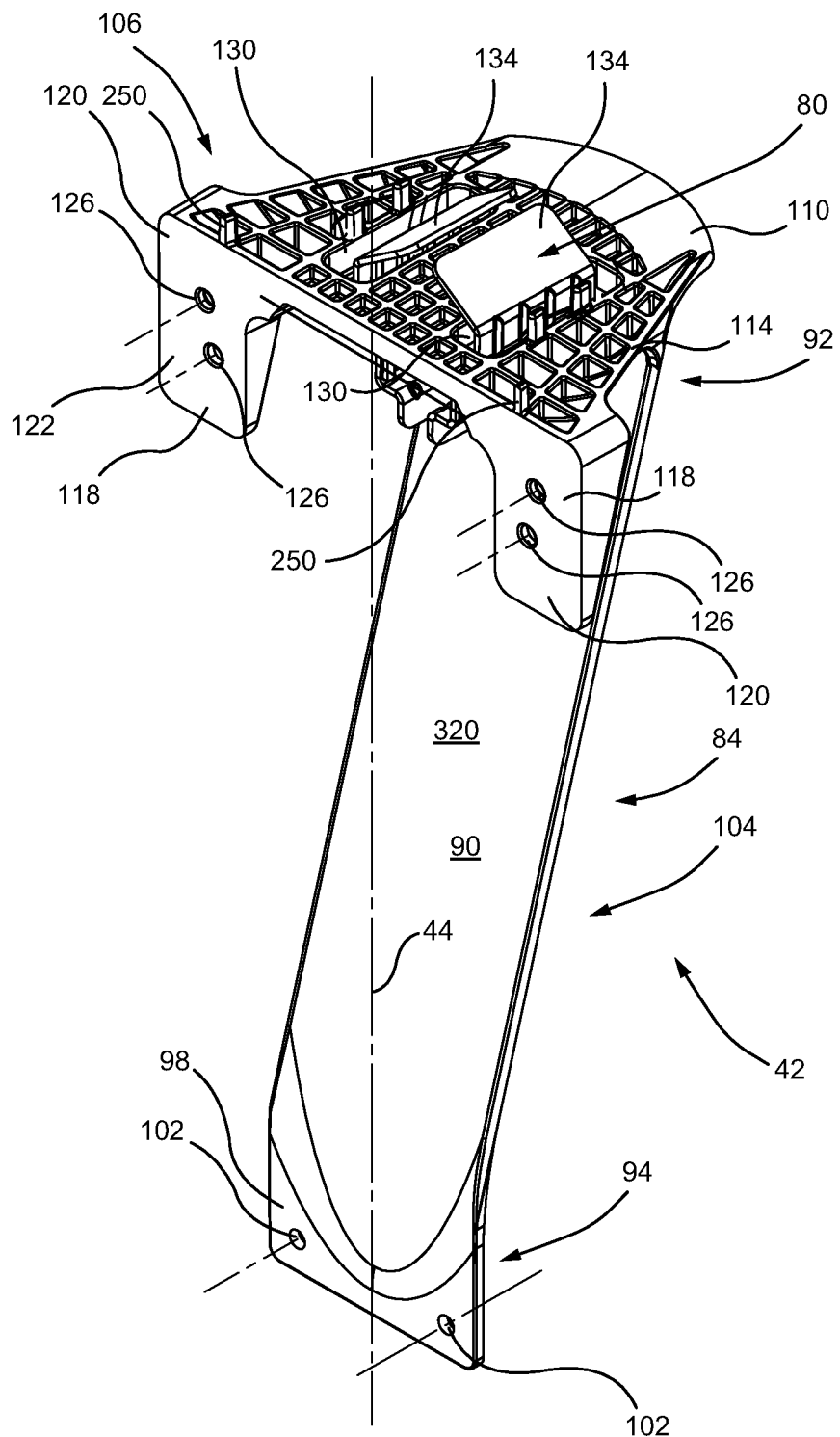
FIG. 4 is an isometric view of a strut in accordance with at least one embodiment of the invention.
Figure 5:
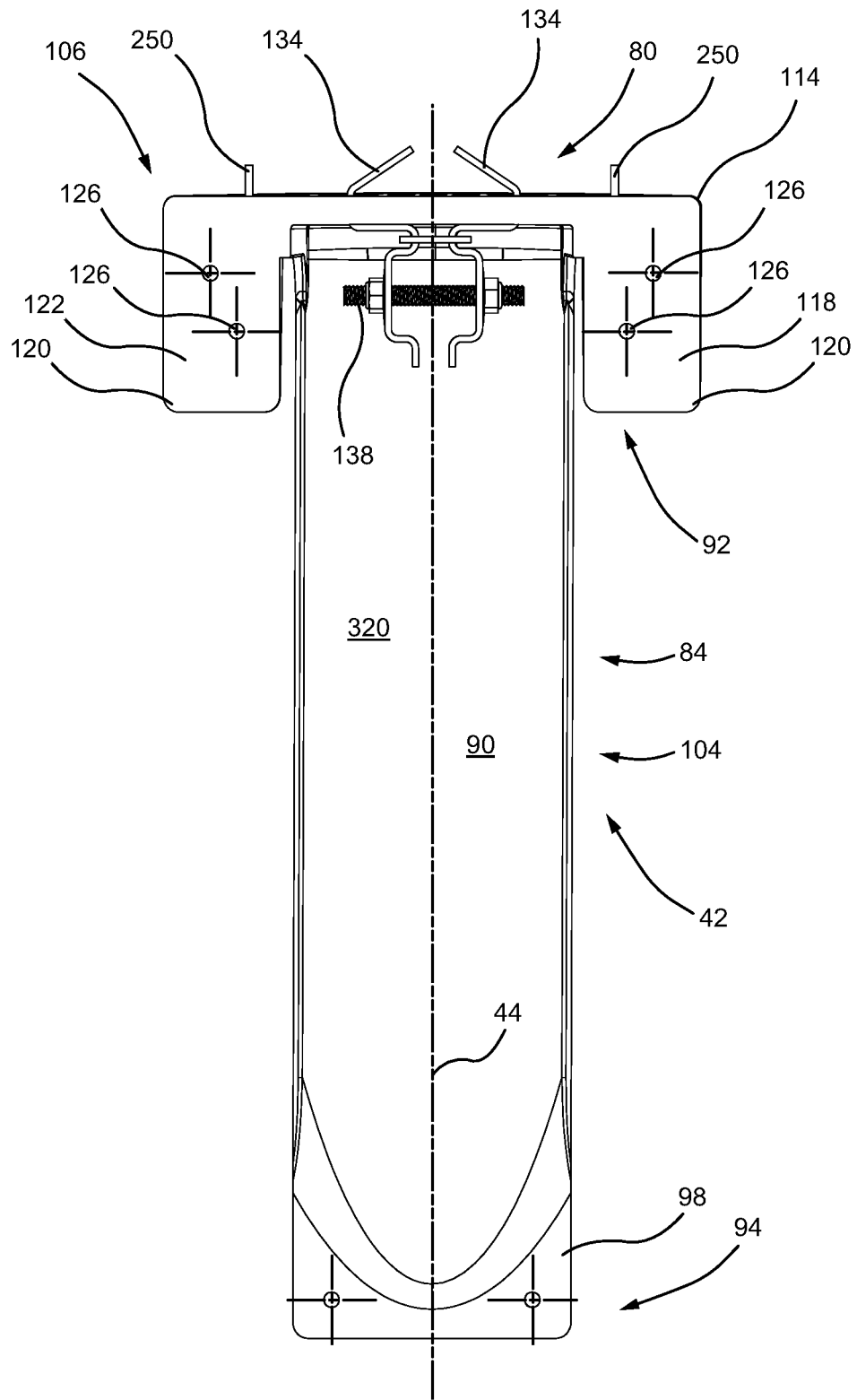
FIG. 5 is a front elevation view of a strut in accordance with at least one embodiment of the invention.
Figure 6:
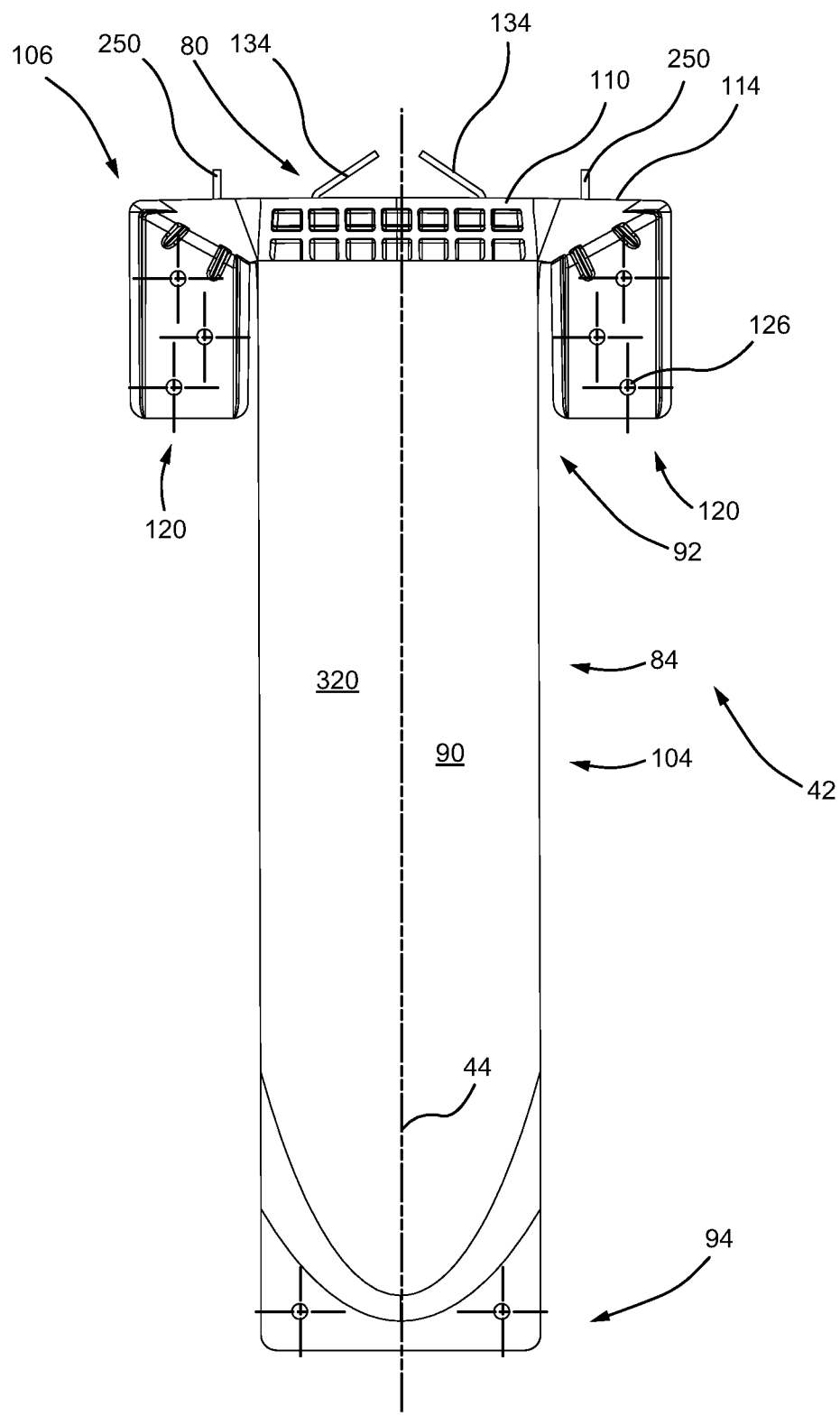
FIG. 6 is a back elevation view of a strut in accordance with at least one embodiment of the invention.
Figure 7:
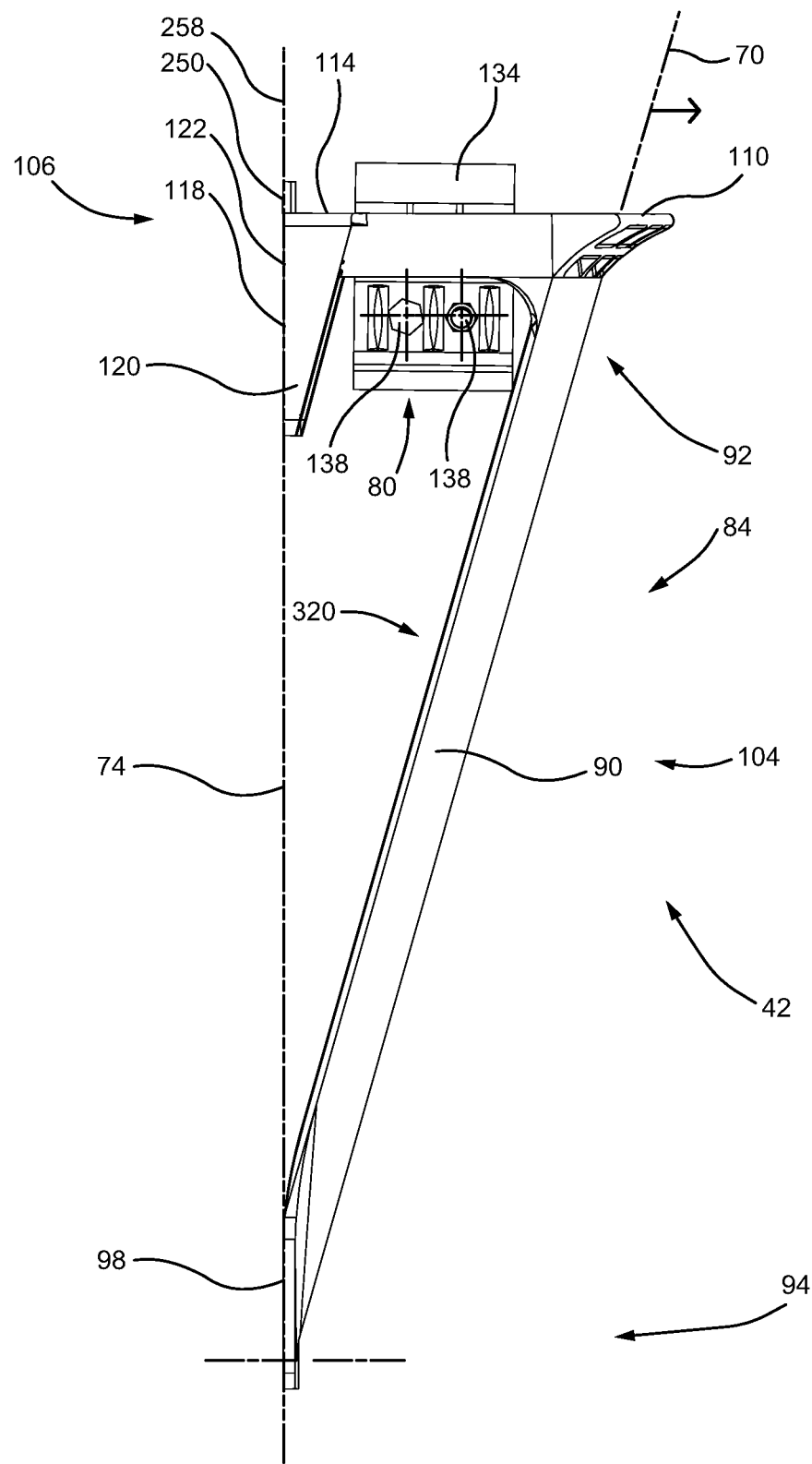
FIG. 7 is a side elevation view of a strut in accordance with at least one embodiment of the invention.
Figure 8:
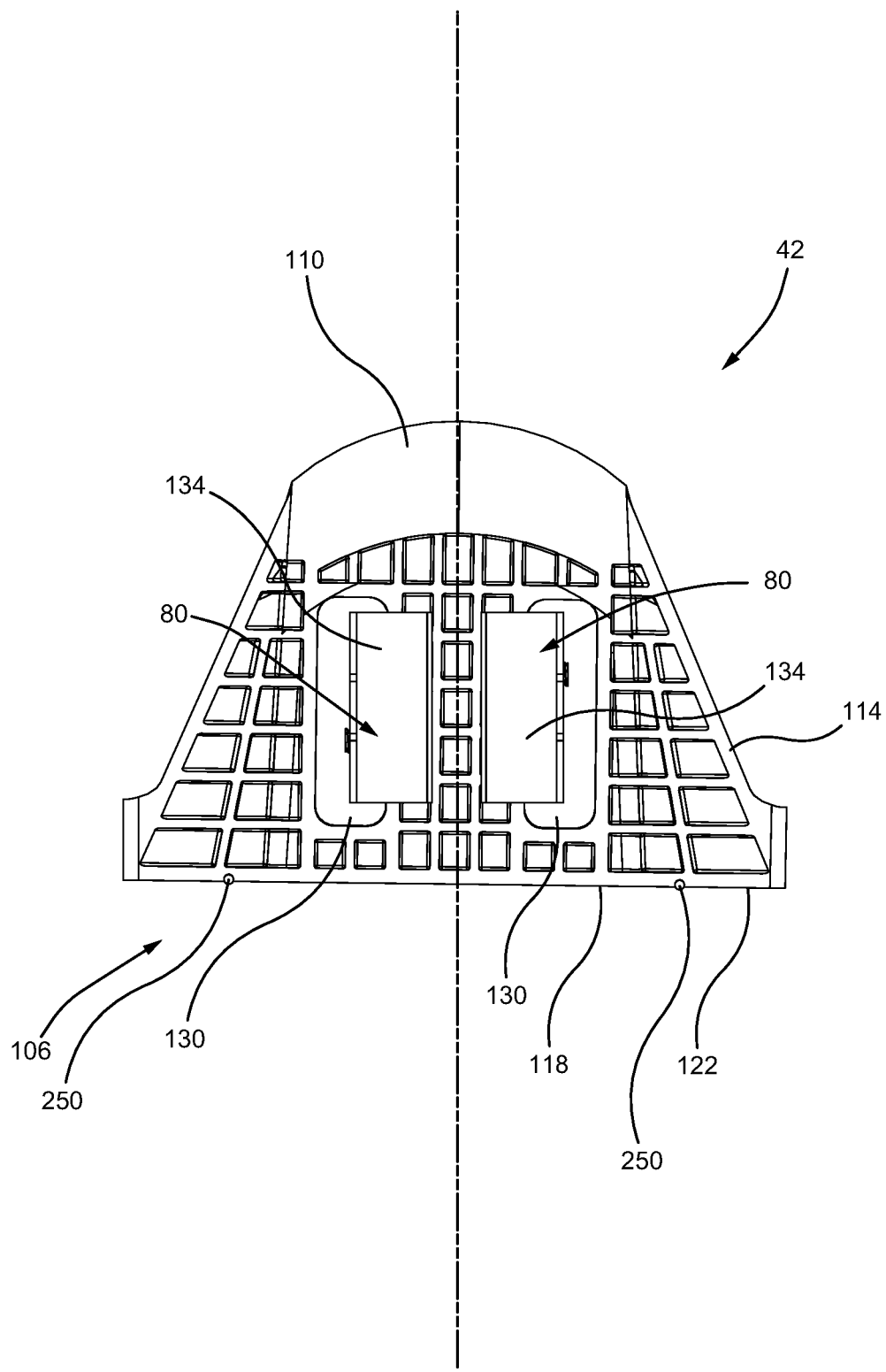
FIG. 8 is a top plan view of a strut in accordance with at least one embodiment of the invention.
Figure 9:
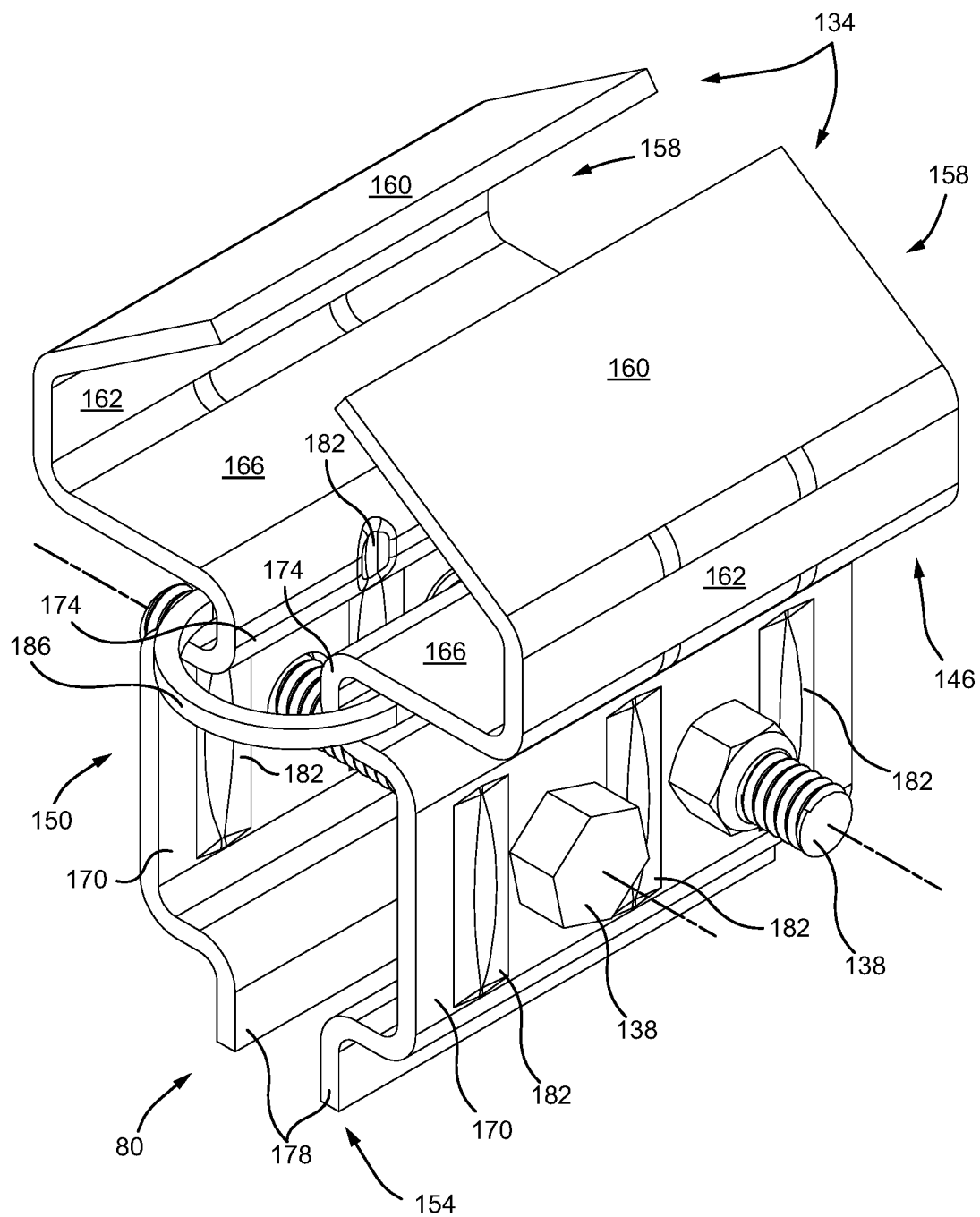
FIG. 9 is an isometric view of a securing mechanism in accordance with at least one embodiment of the invention.

FIG. 4 throughout FIG. 8 are illustrating a securing mechanism 42 including a connector portion 80 and a strut portion 84 both centered along vertical axis 44. The strut portion 84 includes a strut member 90, with a flex portion 104 thereof, securing the skirt panel 38 to a lower portion 94 thereof. In the illustrated embodiment, a planar section 98 includes holes 102 therein for securing the lower portion 94 of the skirt panel 38 with fasteners or rivets, for example. The strut portion 84 includes a securing portion 106 to which is connected the strut portion 84. The securing portion 106 includes a stabilizer 110, a trailer contacting portion 114, a skirt panel contacting portion 118 and a pair of securing wings 120. A stabilizer 110 is located proximal to the longitudinal axis 34 of the trailer 20 when installed on a trailer 20, proximally extending from a projection 70 of the strut member 90 to create a lever that help sustains the loads applied on the strut portion 84 by the skirt panel 38. The skirt panel contacting portion 118 includes a planar section 122 provided with a series of holes 126 therein for securing an upper portion 92 of the skirt panel 38 with fasteners or rivets, for example. Both planar section 98, 122 are preferably aligned along a unique vertical plane 74 for efficiently contacting the skirt panel 38. The trailer contacting portion 114 includes openings 130 therein to receive therein the connector portion 80 for securing the strut portion 84 to the trailer 20.

Figure 13:
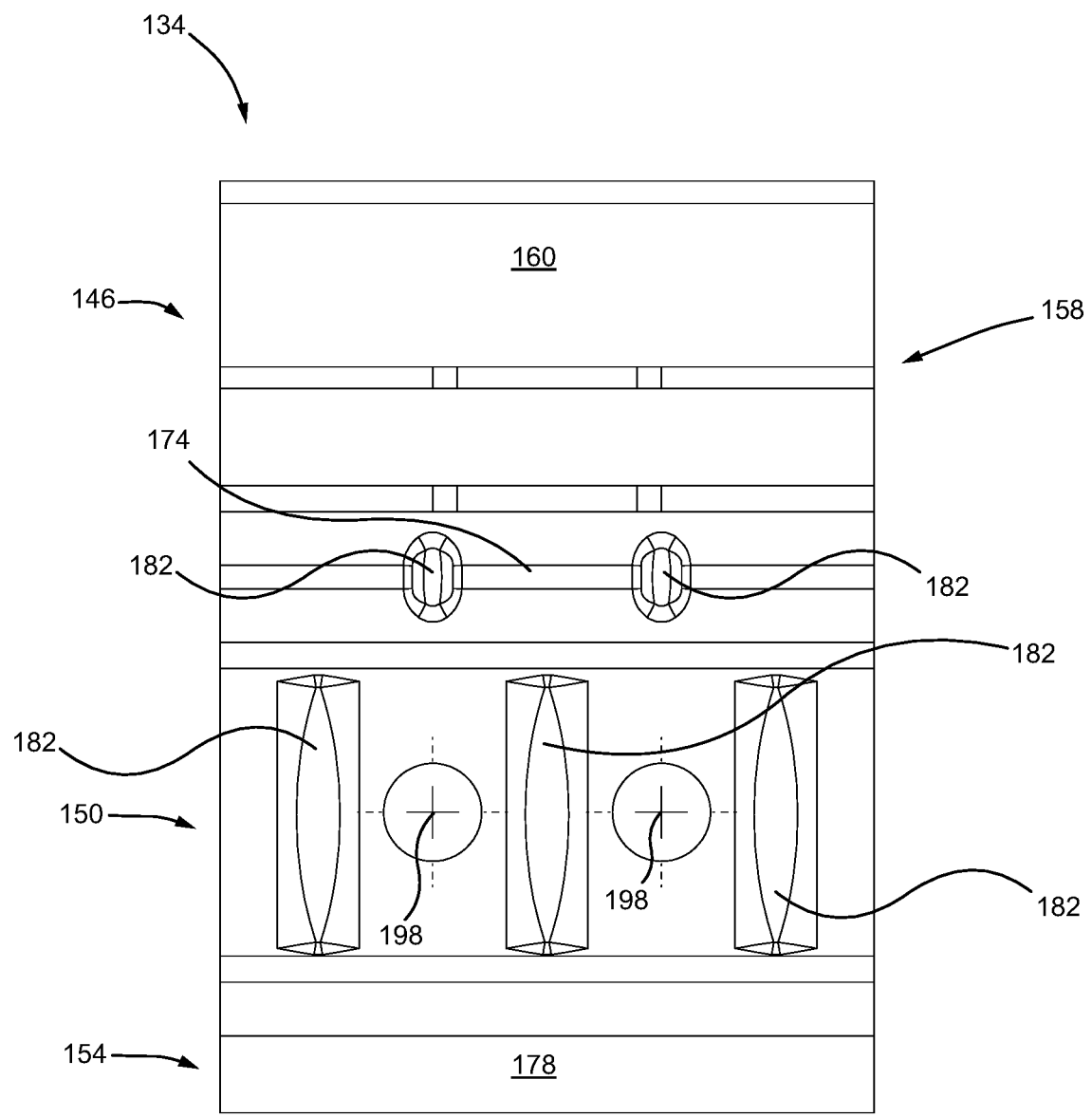
FIG. 13 is a front elevation view of a portion of a securing mechanism in accordance with at least one embodiment of the invention.
Figure 14:
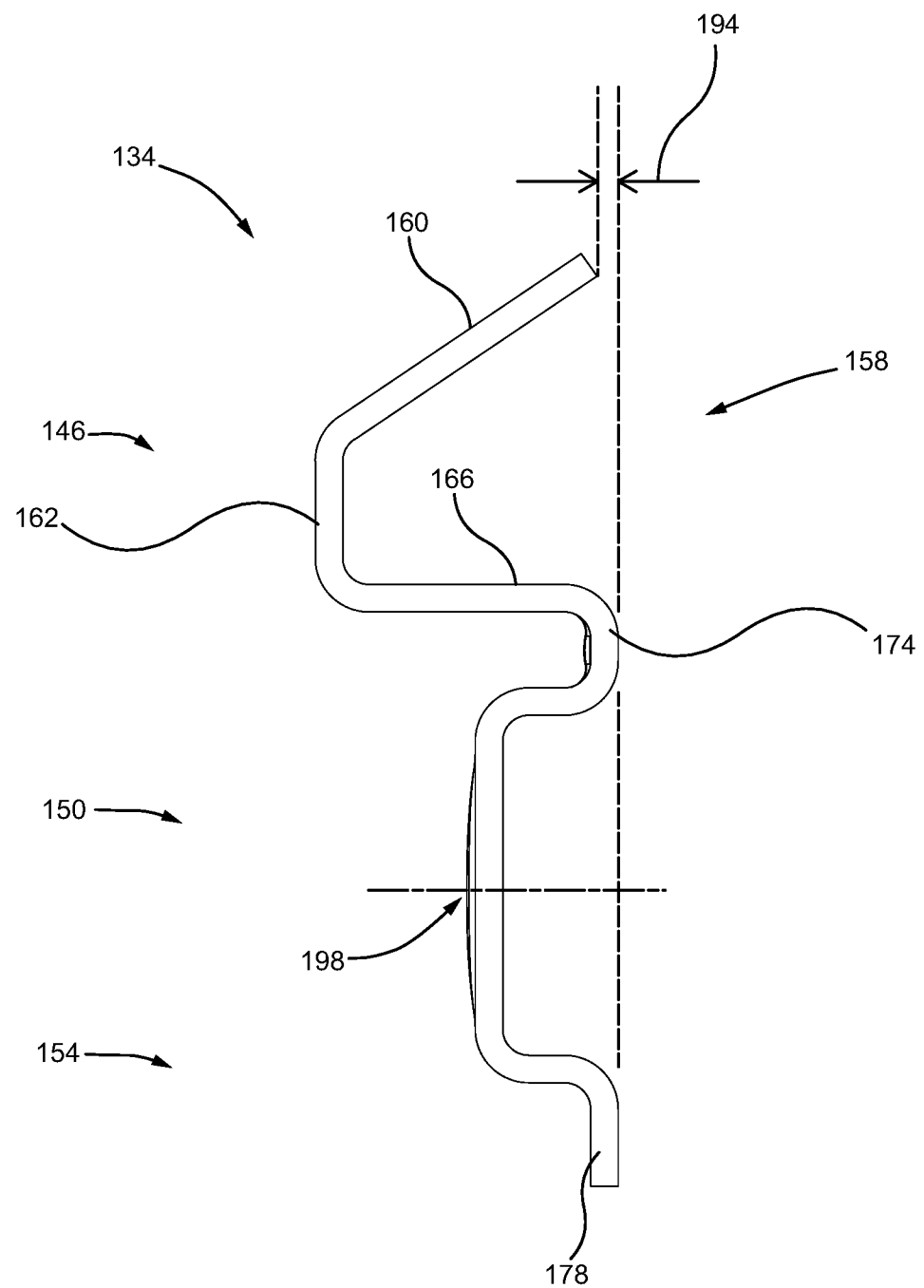
FIG. 14 is a side elevation view of a securing mechanism in accordance with at least one embodiment of the invention

The connector portion 80 is embodied as two opposed clamps 134 configured to be secured together with, for instance, two fasteners 138. The two opposed clamps 134 are securing together the trailer contacting portion 114 of the strut portion 84 with a lower portion of an I-beam as illustrated in FIG. 13 throughout FIG. 18. Each clamp 134 uses an inclined member 160 and two contacting portions 162, 166 for securing the connector portion 80 with the I-beam 142. However, we will first describe in further details the connector portion 80 before discussing the interaction between the strut portion 84, the connector portion 80 and the I-beam 142.

Figure 10:
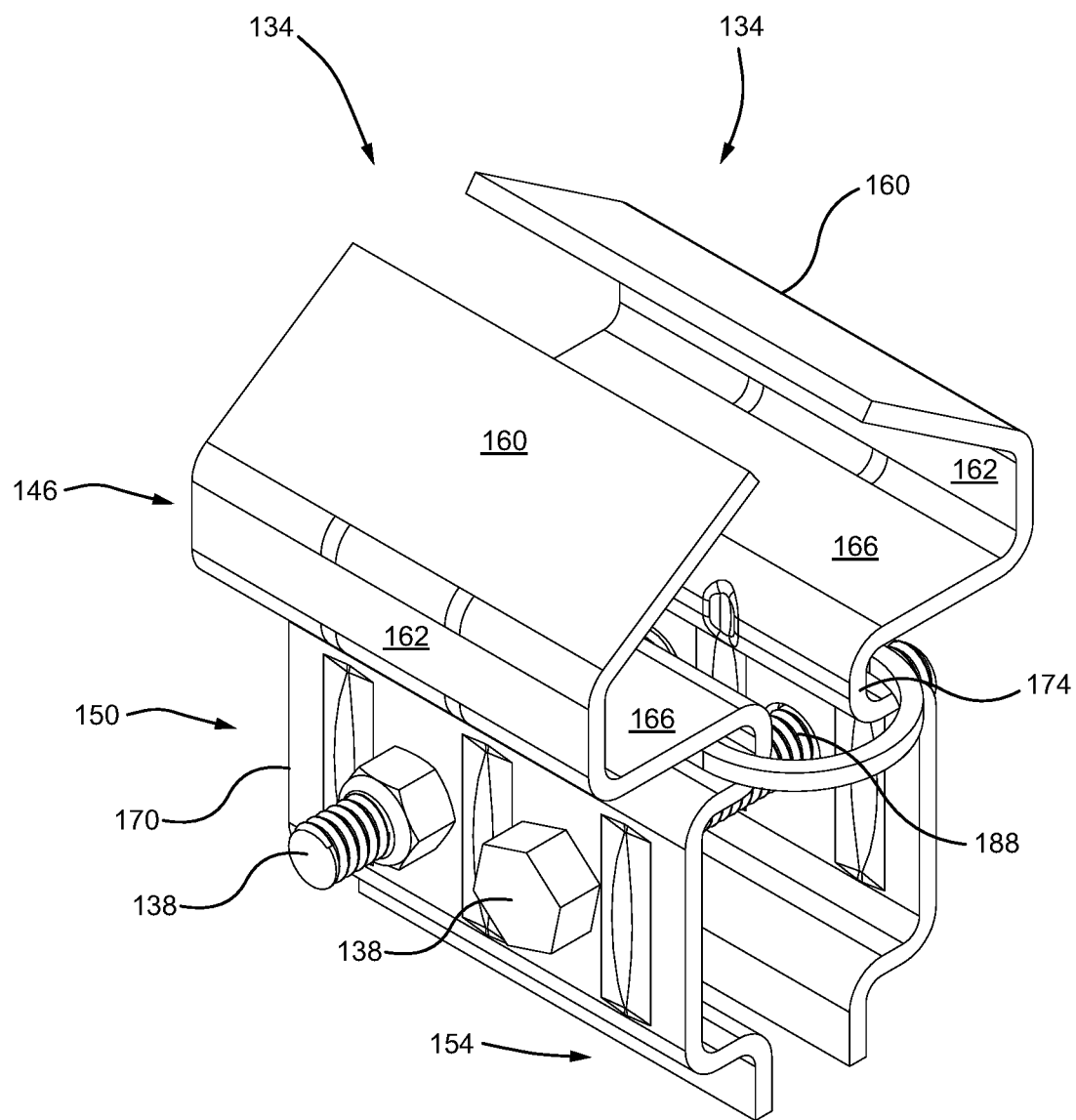
FIG. 10 is an isometric view of a securing mechanism in accordance with at least one embodiment of the invention.
Figure 11:
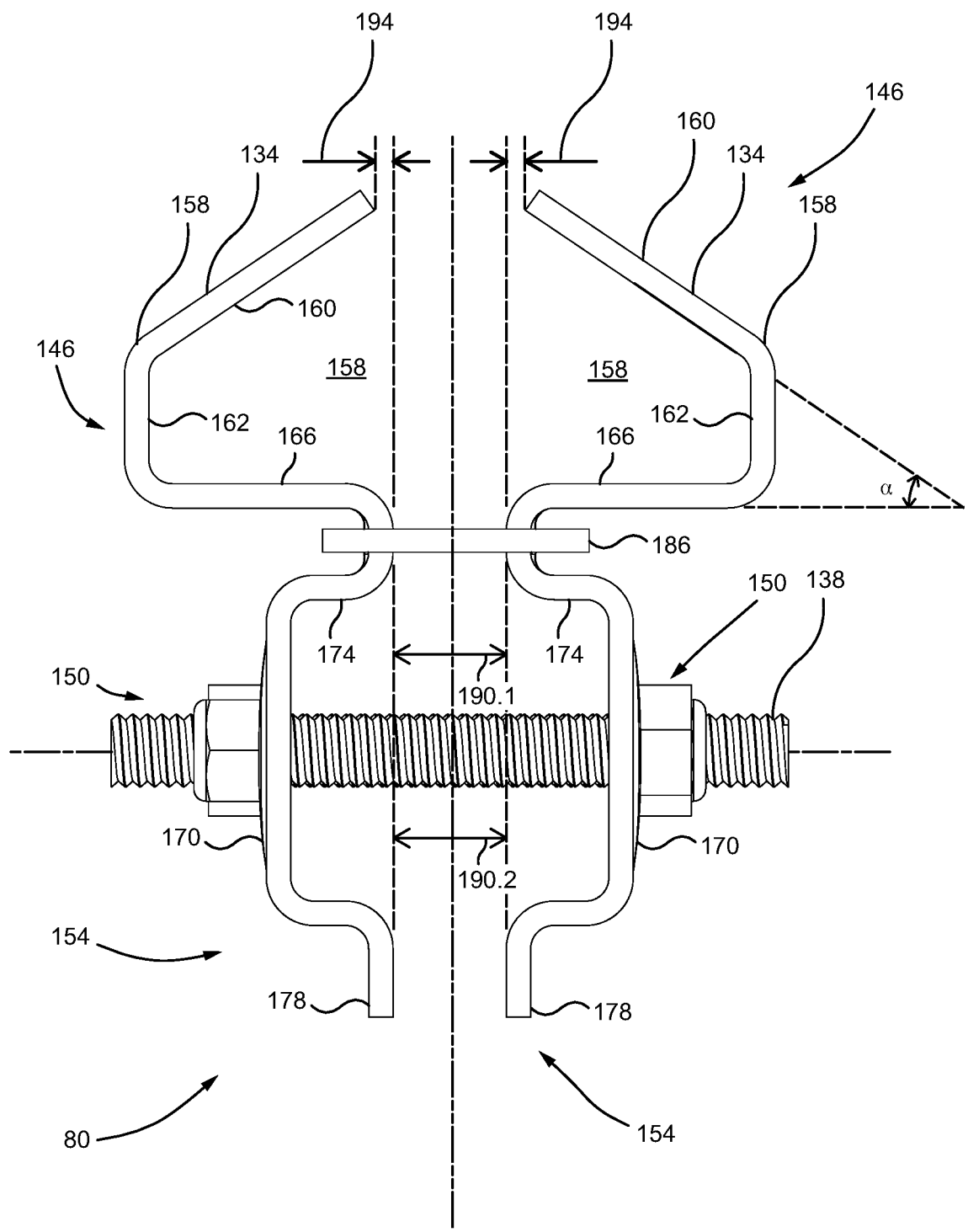
FIG. 11 is a side elevation view of a securing mechanism in accordance with at least one embodiment of the invention
Figure 12:
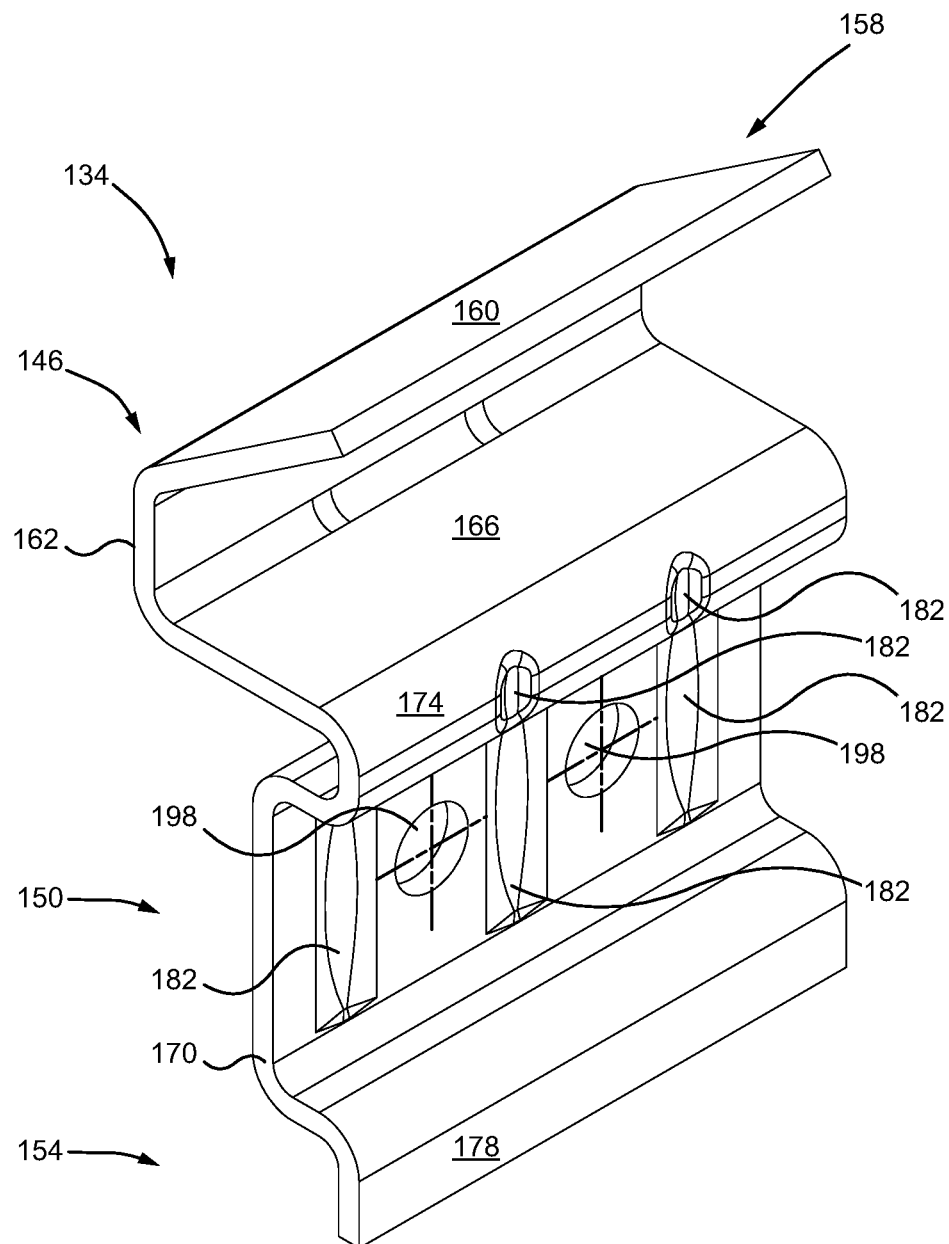
FIG. 12 is an isometric view of a portion of a securing mechanism in accordance with at least one embodiment of the invention.

Moving now to FIG. 10 throughout FIG. 11, a connector portion 80 is illustrated. The connector portion 80 is preferably made of two similar opposed clamps 134 to simplify the assembly and reduce the manufacturing cost. The clamps 134 are made of a strong material capable of withstanding significant mechanical loads and can be shaped with a punch and die process. Metal, or the like, can be used. A material resistant to corrosion, or a protective layer, is also desirable given the condition of use of the connector portion 80 to prevent rust to undesirably attack the connector portion 80.

Each clamp 134 is, in the present embodiment, made of bent sheet metal that is forming a collecting portion 146, a securing portion 150 and a contacting portion 154. The collecting portion 146 includes a collecting member 158 embodied as an inclined member 160 positioned at an angle α, that is about between 30 degree and about 45 degree, and more preferably about 34 degree in the illustrated embodiment, to collect therein sections of I-beams 142 having different dimensions and thicknesses. The collecting member 158 merges into a first contacting portion 162, configured to laterally abut sides of an I-beam 142, that merges into a second contacting portion 166 configured to vertically contact a surface of the connector portion 80. A securing portion 170 is formed between a first protruding member 174 and a second protruding member 178. Both members 174, 178 are extending about a similar distance to allow leveled abutment of the two clamps 134 when secured and pulled toward each other with an intervening I-beam 142 having optimal dimensions. The second protruding member 178 is also helpful to prevent premature rotation of the assembly when tightening the bolts 138 by its lever action and touching each other along a line to provide resistance to rotation to the assembly. Additional bents 182 are performed on the clamp 134 to increase the mechanical strength thereof. An elastic member 186, embodied as an elastic band in the embodiment, is used to keep both clamps 134 together in clamping position prior to secure the clamps 134 to the I-beam 142. Helical springs 188 can optionally be used to pretense the assembly as illustrated in FIG. 10. The pre-assembly of the two clamps 134 are allowing suspending the pre-assembly of the two clamps 134 to the I-beam 1 to connect the parts of the aerodynamic skirt assembly 30 in place before securing them in a final operating configuration. Distance 190 is preferably configured to be close to zero (0) when the two clamps are secured toward each other and two times distance 194 is preferably configured to be close to a thickness of a central member of the I-beam 142 when the clamps 134 are secured to a narrow I-beam 142. Conversely, distance 190.1 and 190.2 is going to increase when the clamps 134 are secured to a wider I-beam. Holes 198 are made in the securing portion 170 to accommodate bolts 138 therein to secure both clamps 134 together. The interaction of the securing mechanism 42 with an I-beam 142 is depicted in FIG. 15 throughout FIG. 16.

Figure 18:
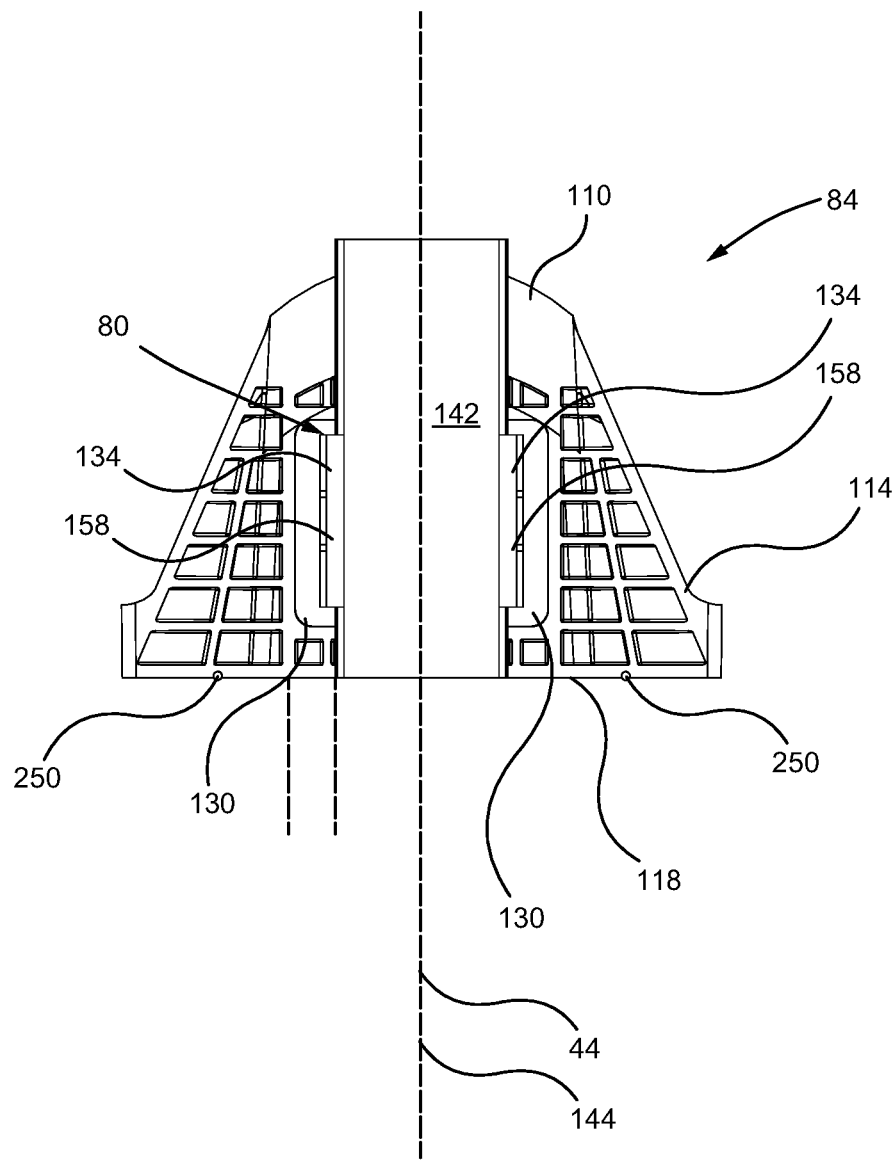
FIG. 18 is a top plan view of a strut attached to a trailer's floor beam in accordance with at least one embodiment of the invention.
Figure 19:
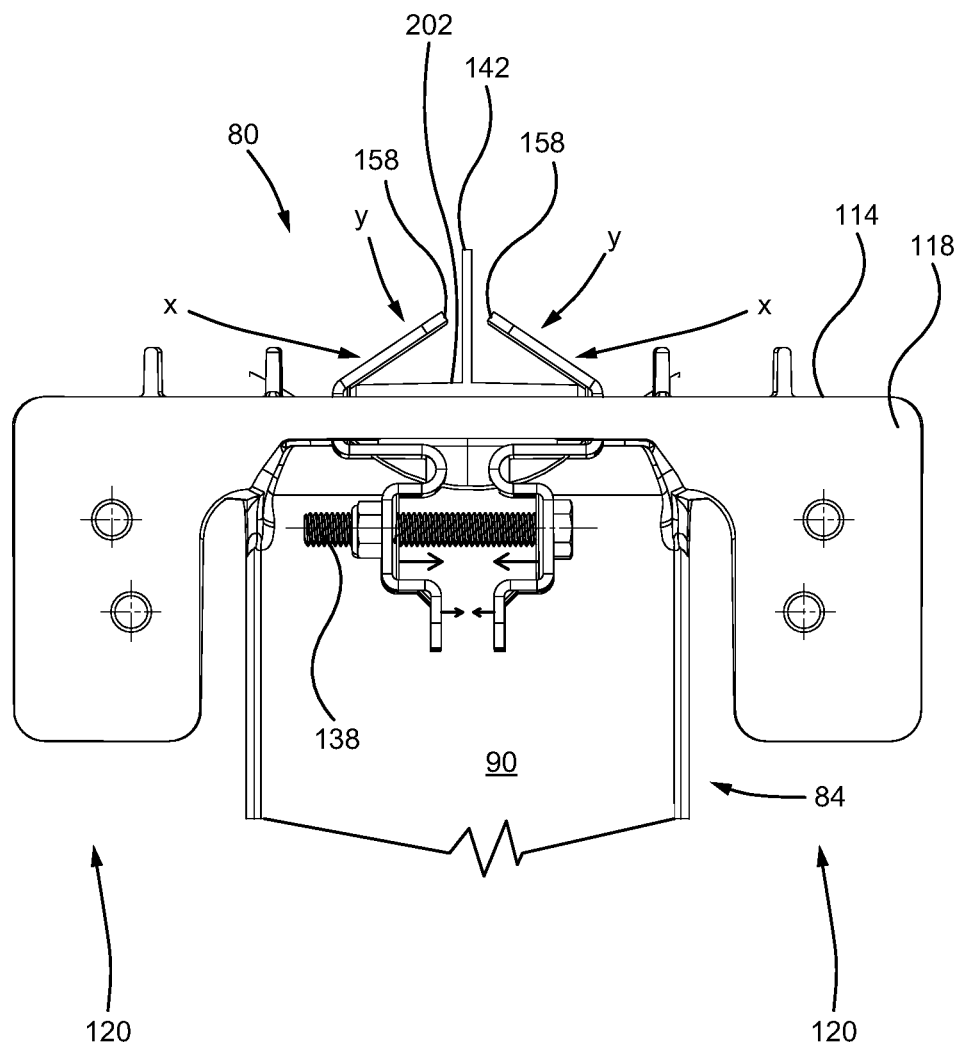
FIG. 19 is a front elevation view of a portion of a strut attached to a trailer's floor beam in accordance with at least one embodiment of the invention.
Figure 20:
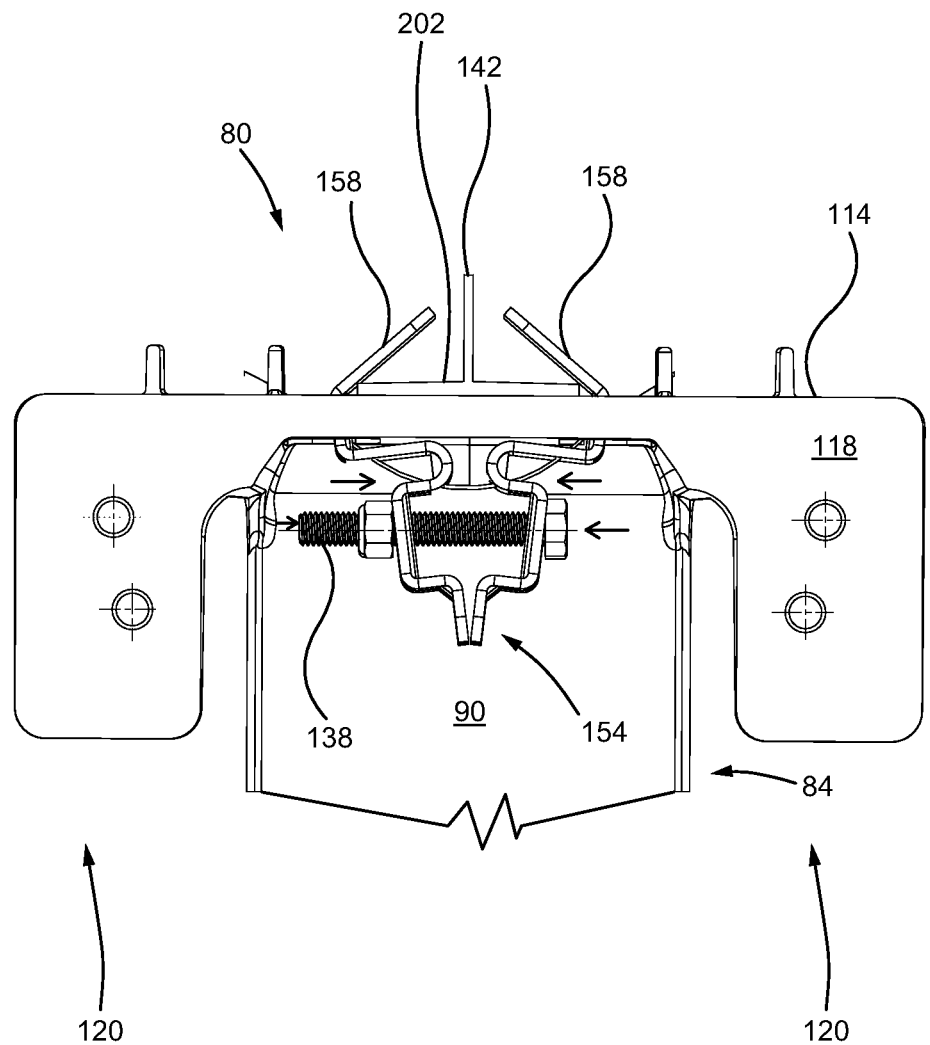
FIG. 20 is a front elevation view of a portion of a strut attached to a trailer's floor beam in accordance with at least one embodiment of the invention.

It can be appreciated from FIG. 13 throughout FIG. 18, the collecting portion 146, with the inclined member 160, is compressing together vertically (y) and laterally (x) the trailer-contacting portion 114 and a lower portion 202 of the I-beam 142. The illustrated structure also has the capacity to adapt to a variety of I-beams 142. The lower portion 202 (bottom flange) of the I-beam can be wider 206 and/or thicker 210 and still be captured and secured by the connection portion 90 of the securing mechanism 42. Typically, the lower portion 202 of the I-beam 142 is illustratively varying from about 38 mm to about 80 mm width, and thickness of about 3 mm to about 13 mm. This is illustrated in FIG. 19 and in FIG. 20.

Figure 17:
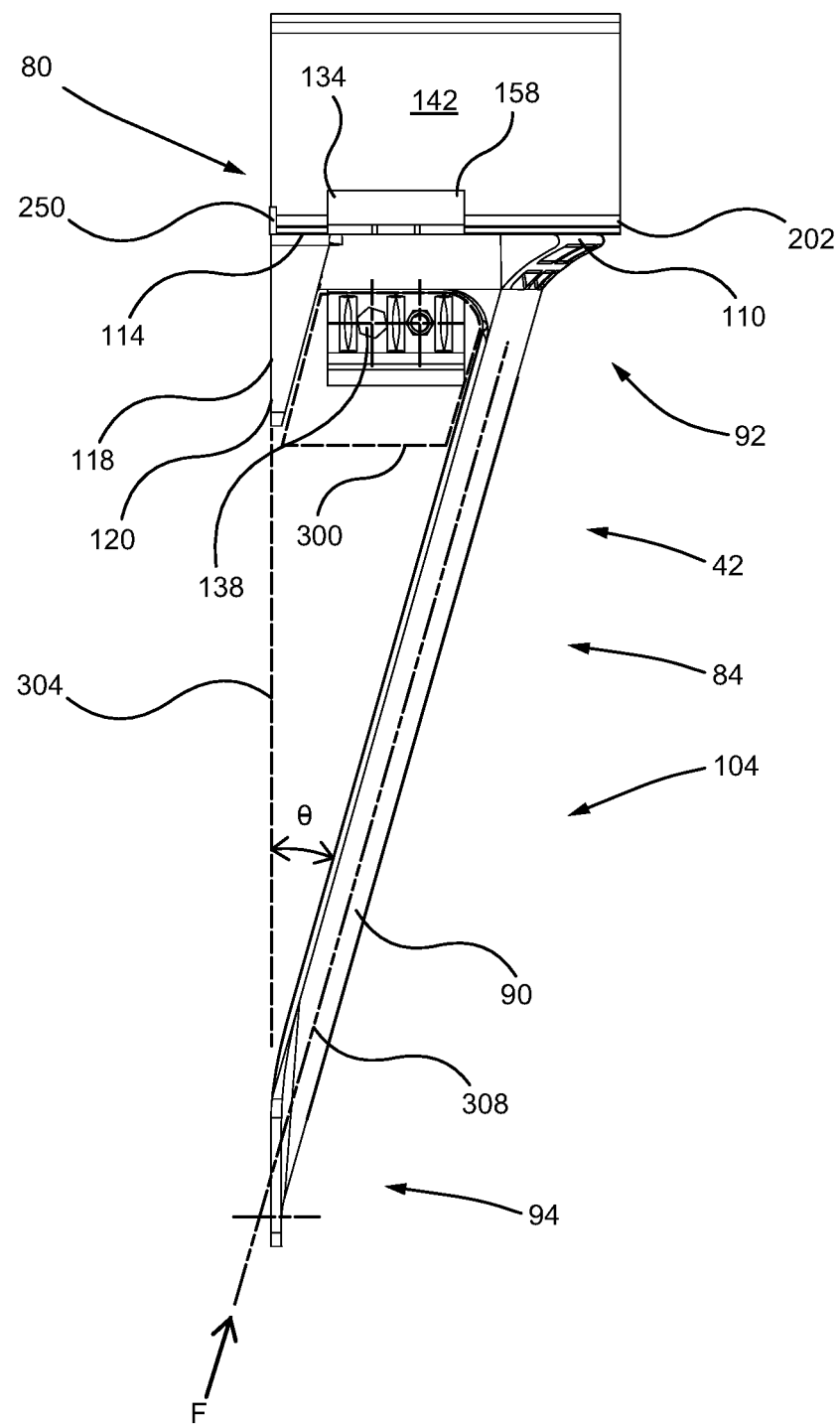
FIG. 17 is a side elevation view of a strut attached to a trailer's floor beam in accordance with at least one embodiment of the invention.

As identified in FIG. 17, the strut portion 84 is, for instance, sized and designed to buckle when a force F of about between 400 N to 600 N is applied along the longitudinal axis 308. The buckling force F can alternatively be between about 450 N to 550 N. A narrower range of force F can alternatively be between about 470 N to 520 N without departing from the scope of the present invention. Corresponding force applied normal to the skirt panel can be inferred from the axial buckling force above.

Figure 15:
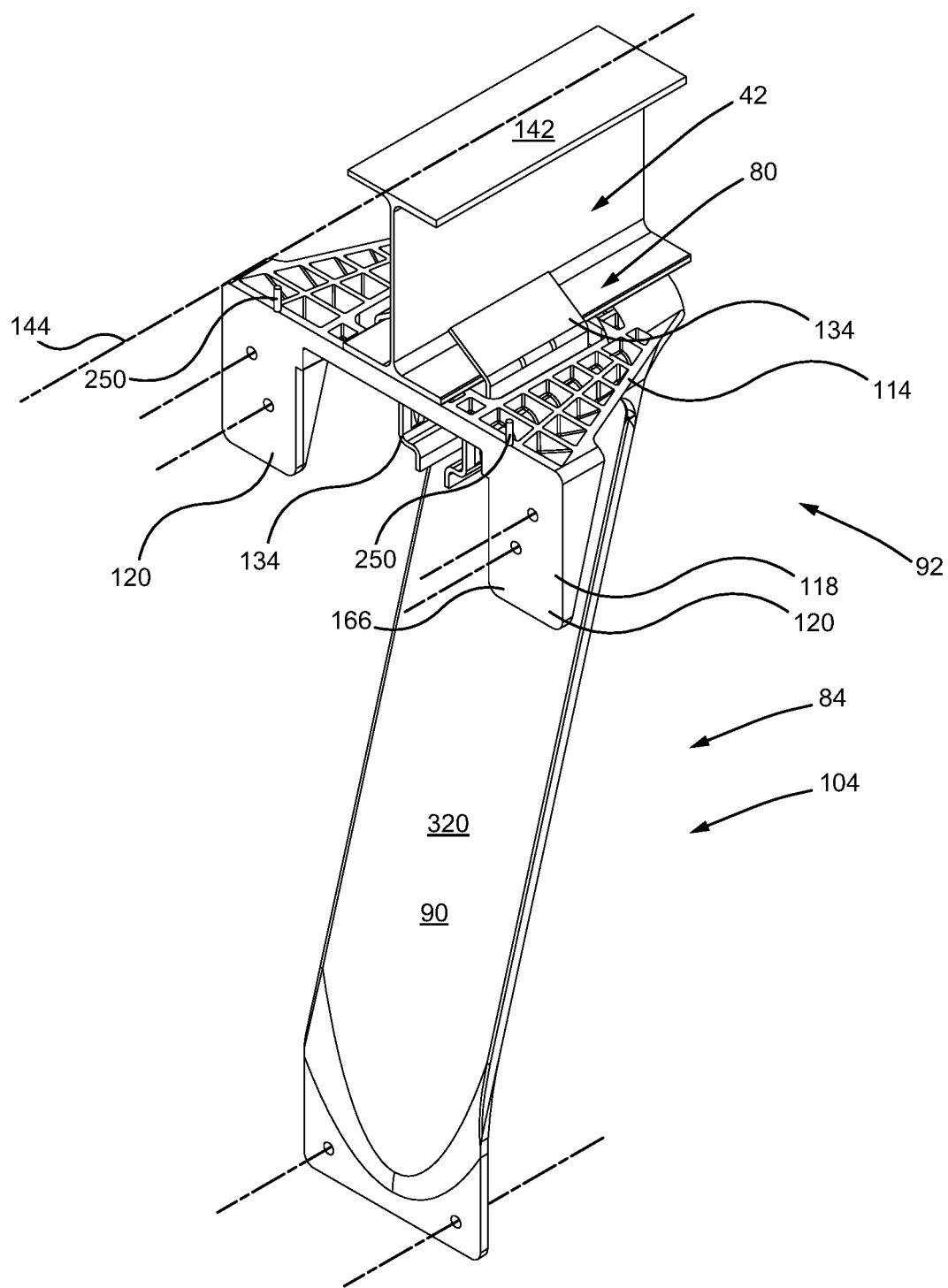
FIG. 15 is an isometric view of a strut attached to a trailer's floor beam in accordance with at least one embodiment of the invention.
Figure 16:
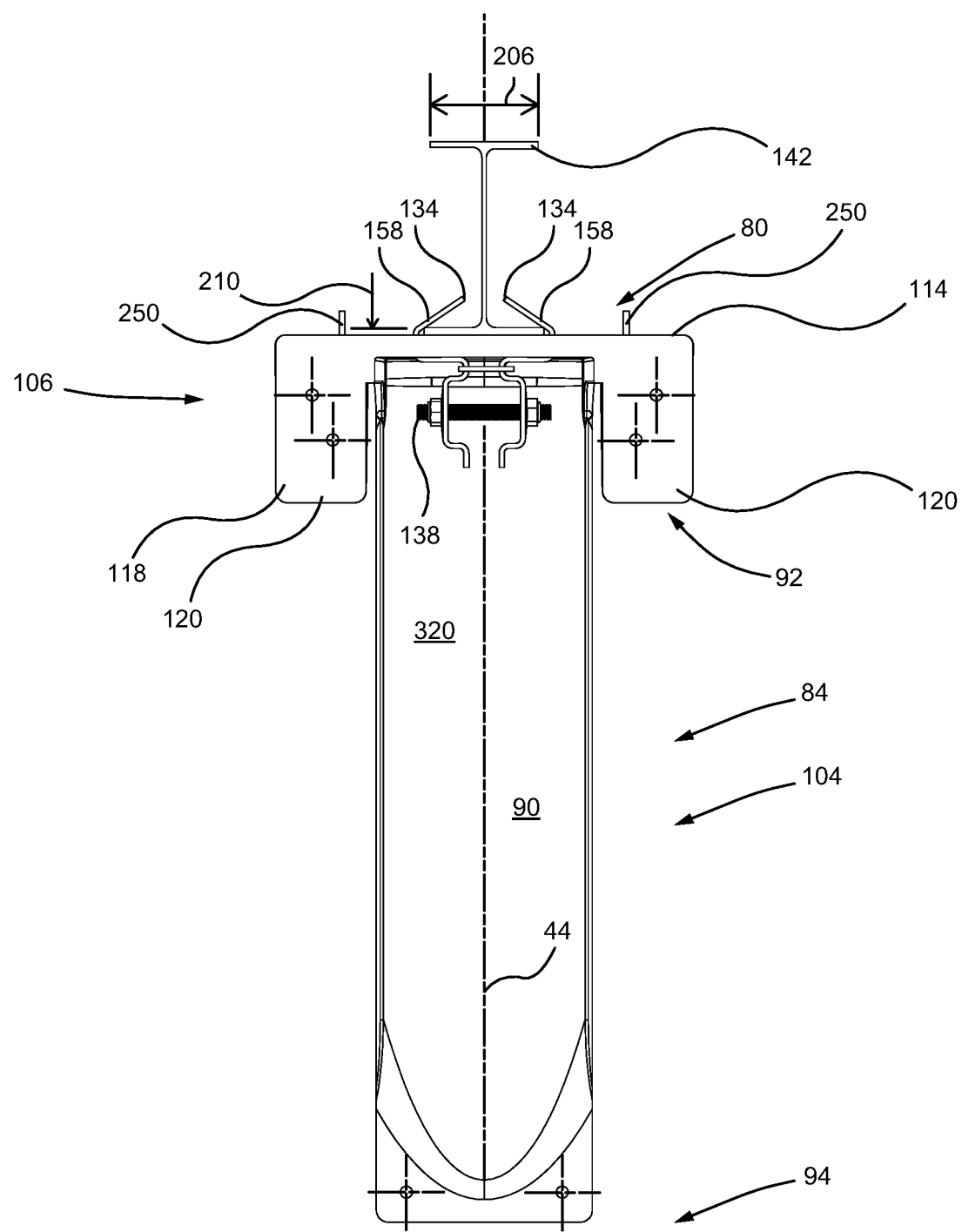
FIG. 16 is a front elevation view of a strut attached to a trailer's floor beam in accordance with at least one embodiment of the invention.
Figure 21:
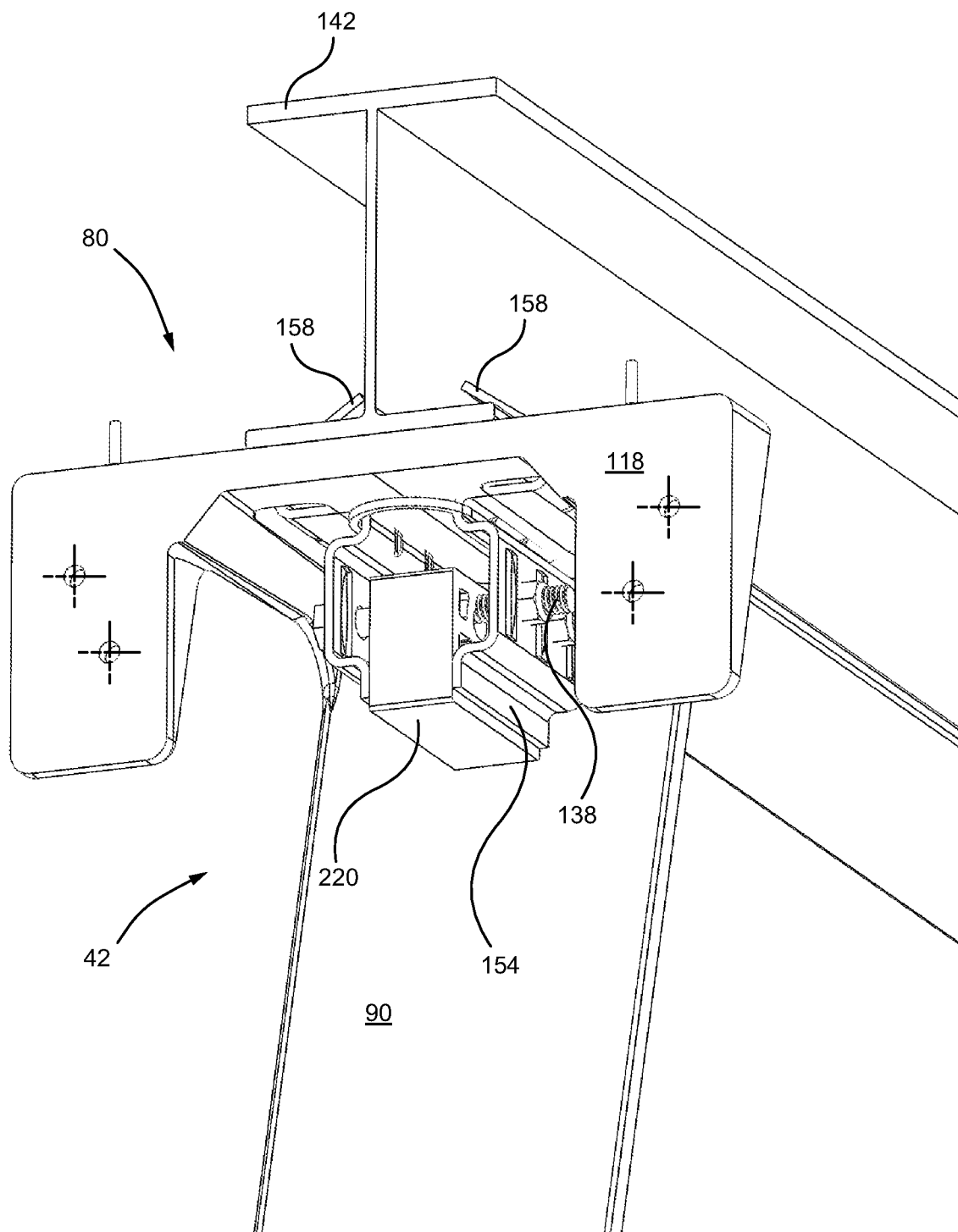
FIG. 21 is an isometric view of a portion of a strut attached to a trailer's floor beam in accordance with at least one embodiment of the invention.
Figure 22:
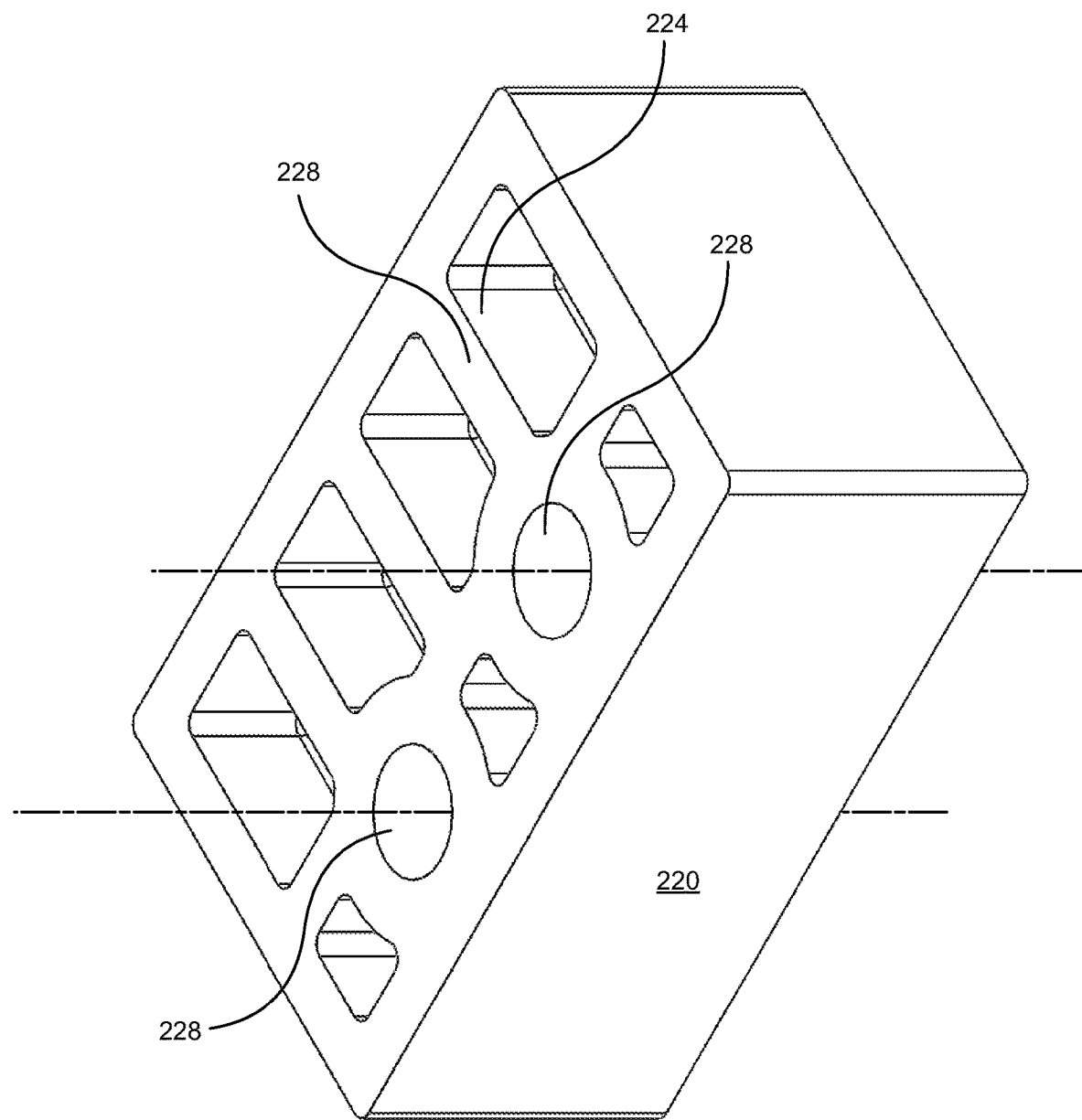
FIG. 22 is a perspective view of a portion of a securing mechanism in accordance with at least one embodiment of the invention.
Figure 23:
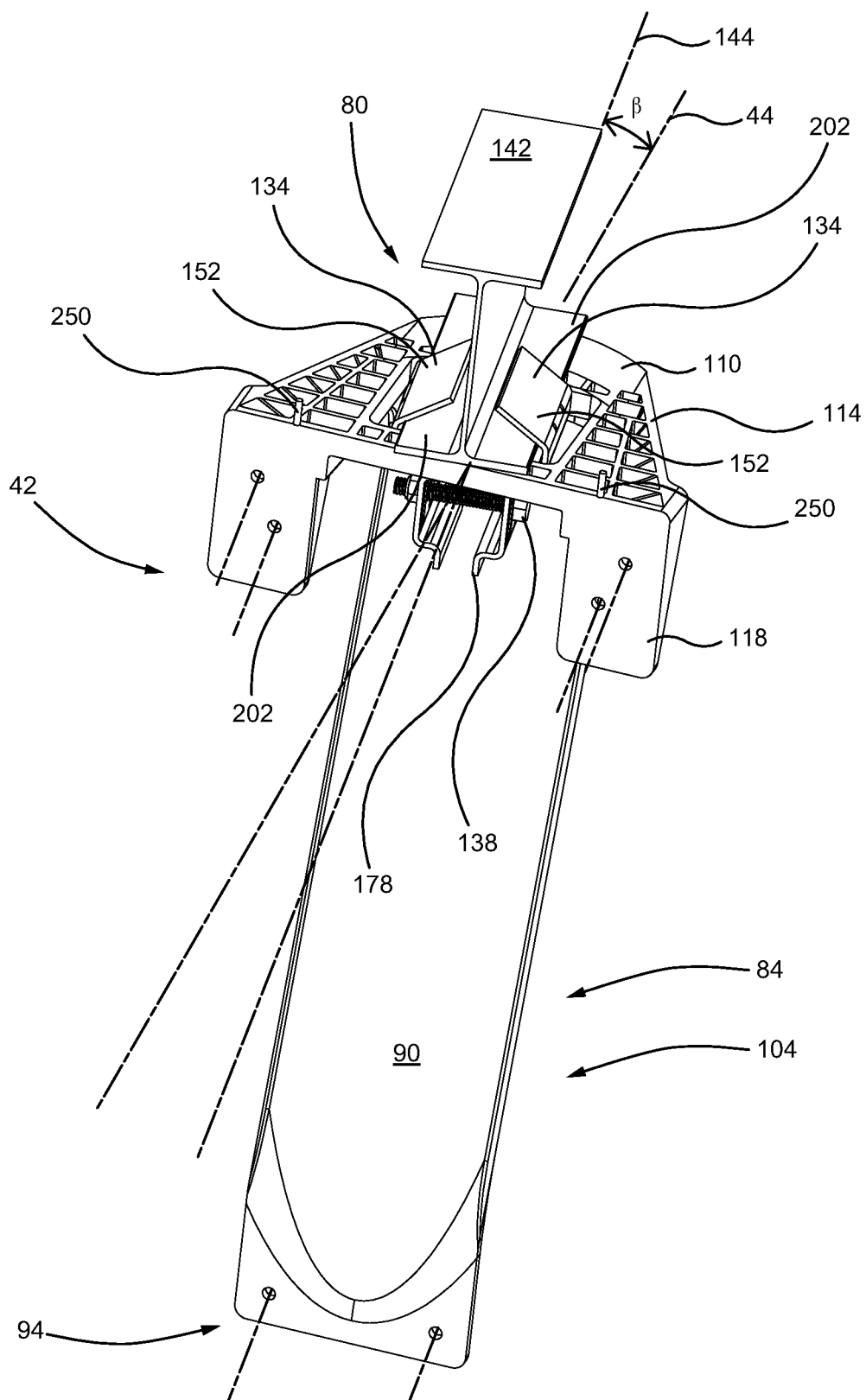
FIG. 23 is an isometric view of a strut attached to a trailer's floor beam in accordance with at least one embodiment of the invention.
Figure 24:
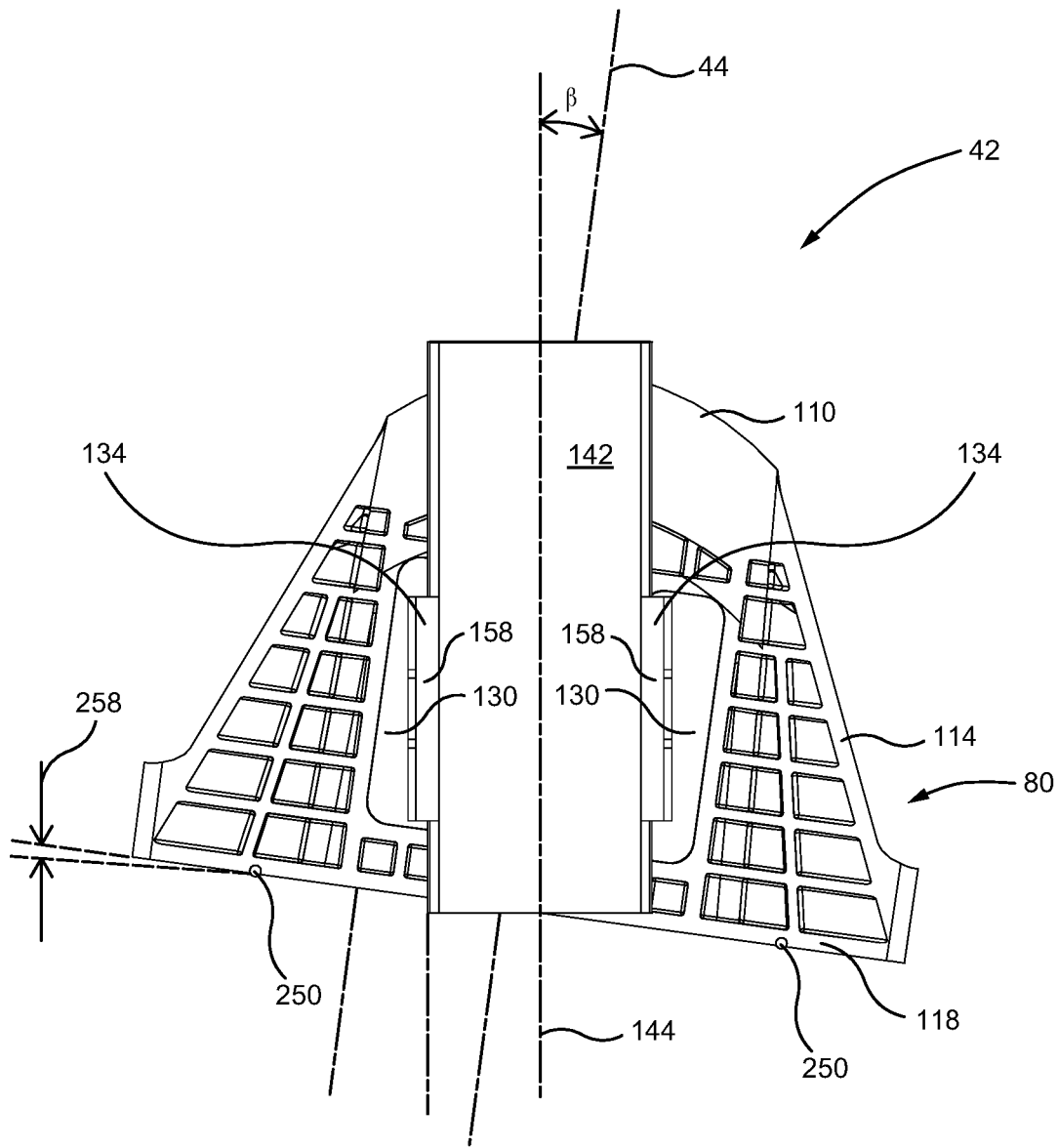
FIG. 24 is a top plan view a strut attached to a trailer's floor beam in accordance with at least one embodiment of the invention.
Figure 25:
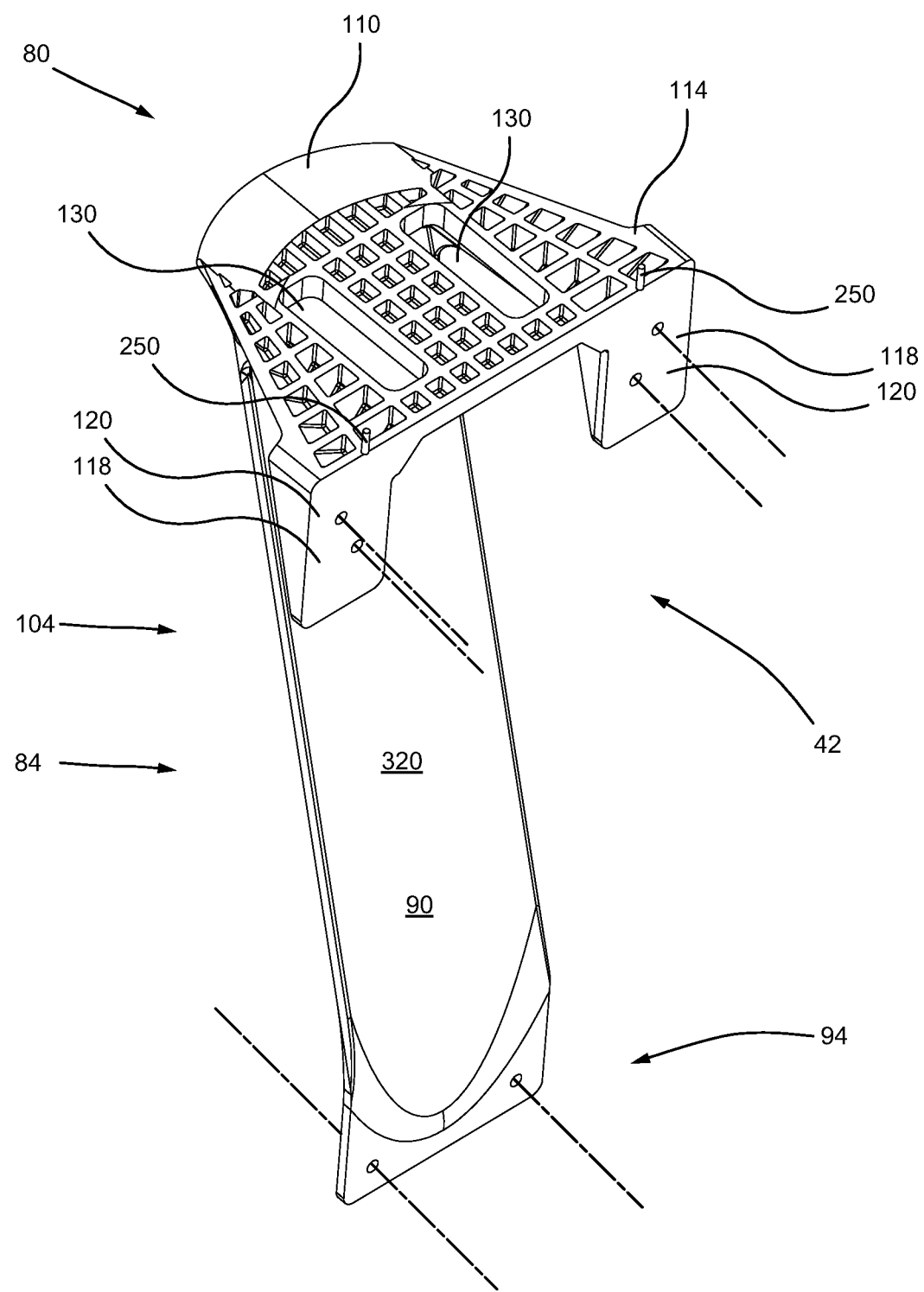
FIG. 25 is an isometric view of a strut in accordance with at least one embodiment of the invention.

One can appreciate the I-beam 142 is parallel with the central axis 144 of the I-beam 142 in FIG. 15 throughout FIG. 21 and in FIG. 23 and FIG. 24. The securing mechanism 42 is constructed to keep the pair of clamps 134 aligned and allow misalignment of the strut portion 84 in respect with the I-beam 142 of the trailer 42. The alignment between the clamps 134 can be made by contacting the contacting portions 154 together. However, in a case of a wider I-beam 142, a spacer 220 can be required to space apart the contacting portions 154. The spacer 220, better seen in FIG. 22 can be made of different material having suitable mechanical properties like steel, aluminum or plastic. The spacer 220 includes optional voids 224 and ribs 228 to lighten the spacer 220, reduce curing time, eliminate sink marks and reinforce desirable areas thereof. The spacer further includes fastener-receiving portions 228 configured to receive fasteners 138 therein. A misalignment between the strut portion 84 and the I-beam 142 of the trailer 42 can occur if the trailer 20 has I-beams 142 that are not perfectly aligned and, depending of the installation configuration of the skirt panel 38 along the trailer 20, the front portion 58 of the skirt panel 38 can proximally lean toward the center of the trailer 20 hence progressively curving or bending and be located at an angle with the I-beam 142 of the trailer 20 as illustrated in FIG. 23 and FIG. 24. The size of the openings 130 is designed to accommodate a flexible installation of the pair of clamps 134 that can be located to accommodate position variation with, for instance, an angle β thereof.

Figure 29:
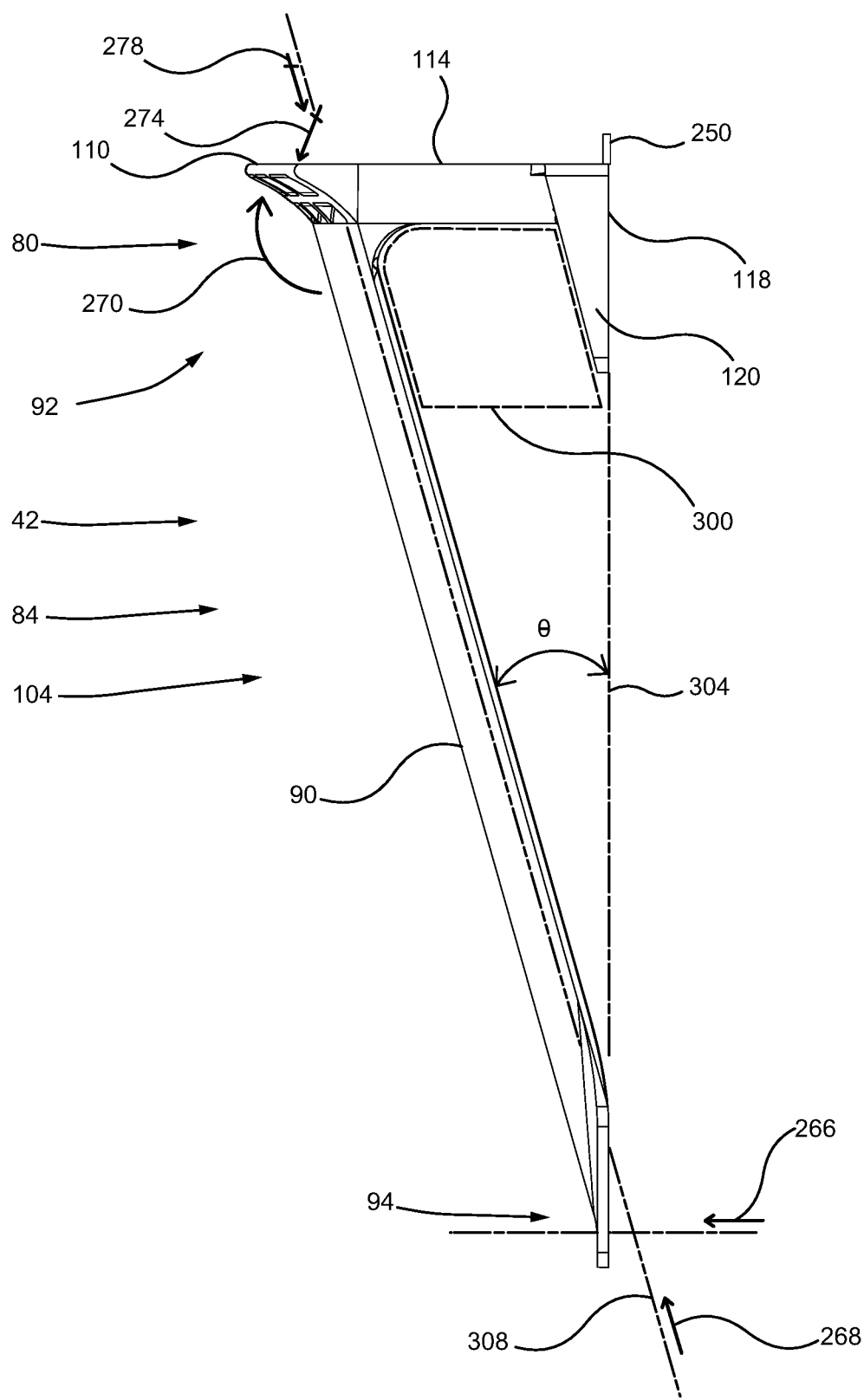
FIG. 29 is a side elevation view of a strut in accordance with at least one embodiment of the invention.
Figure 34:
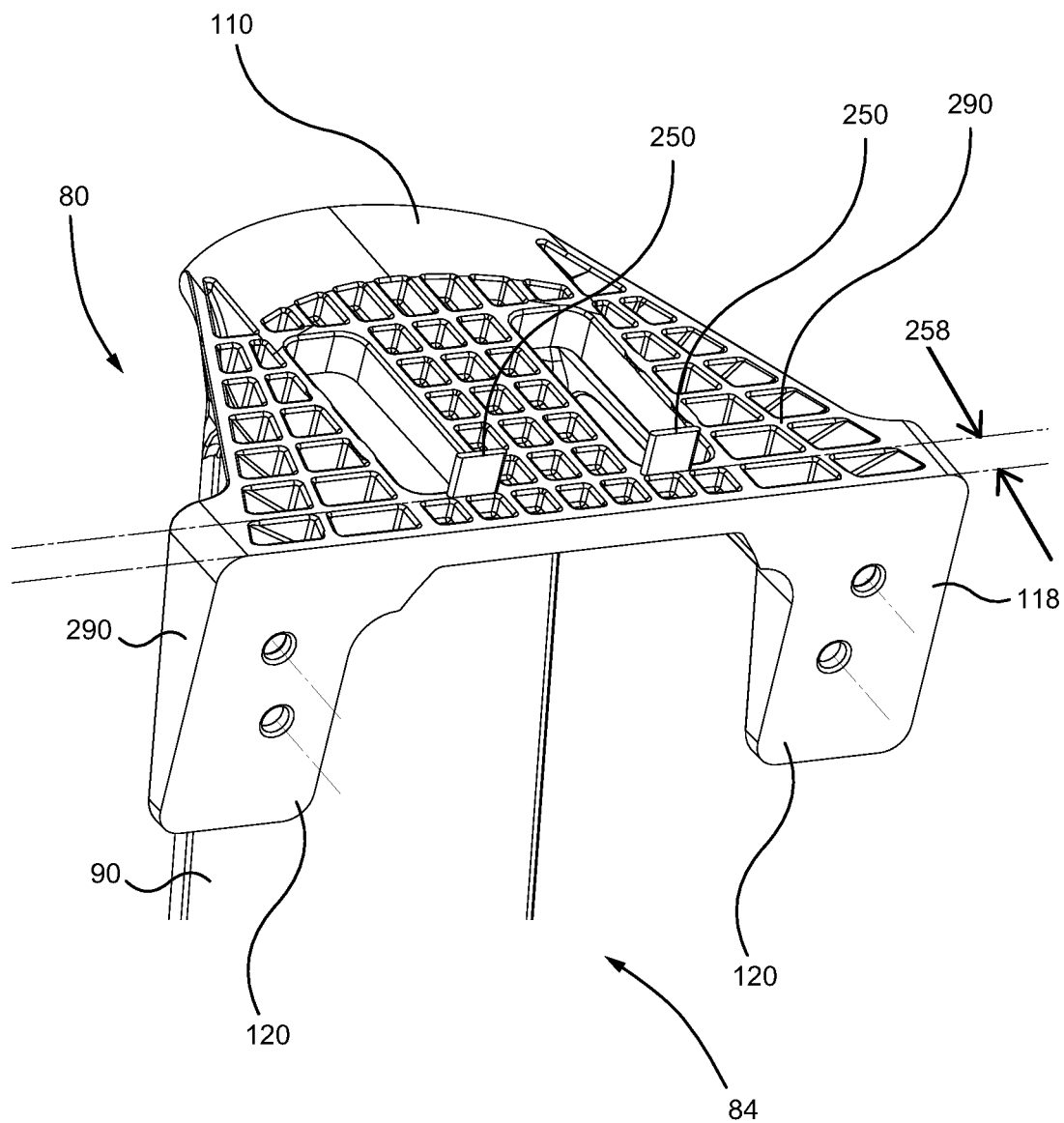
FIG. 34 is a perspective view of a portion of a strut in accordance with at least one embodiment of the invention.
Figure 35:
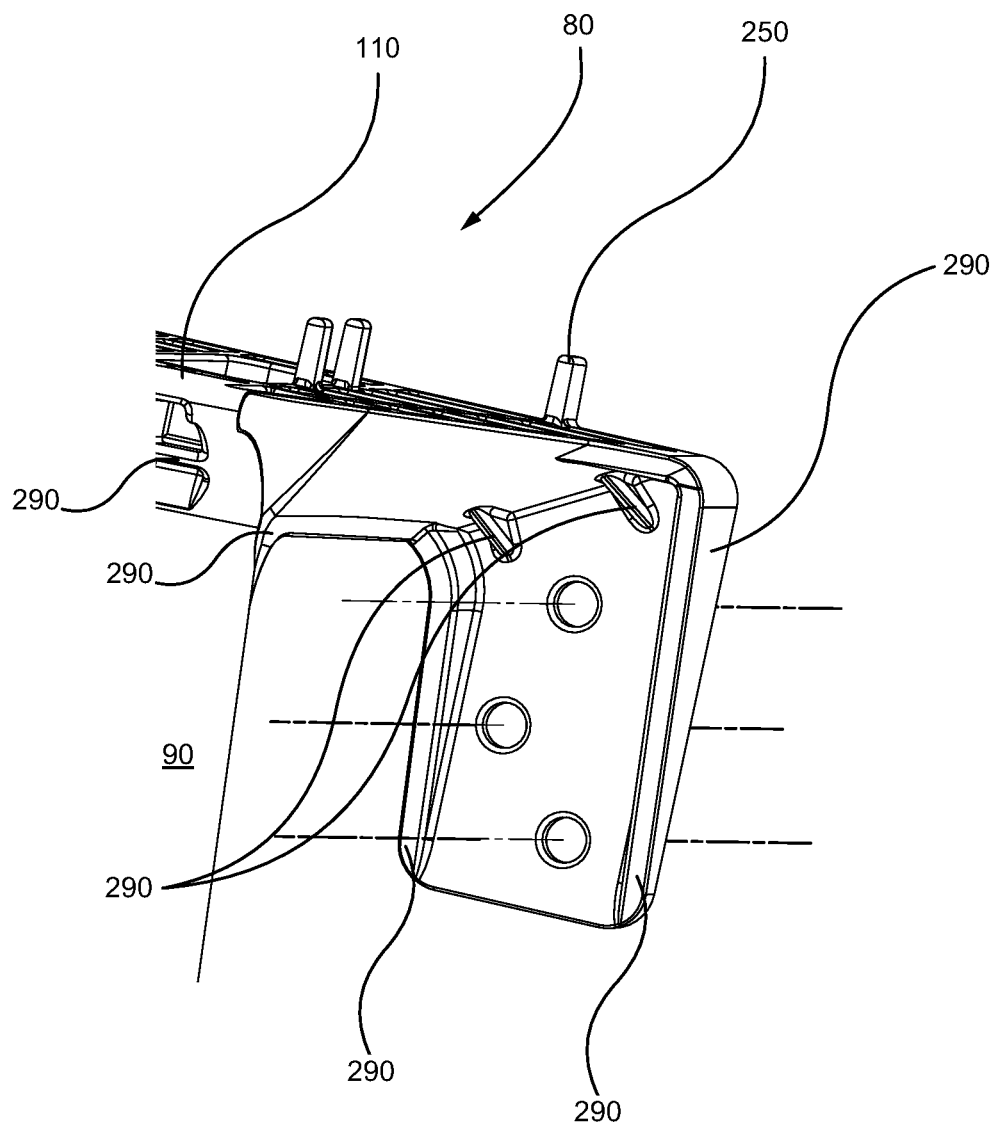
FIG. 35 is a perspective view of a portion of a strut in accordance with at least one embodiment of the invention.

As mentioned above, the strut portion 84 is preferably located on the trailer 20 to have the exterior of the skirt panel 38 vertically aligned, flush with the side wall of the trailer 20. The skirt panel 38 is hence used as a vertical continuity of the trailer's 20 side wall. The alignment of the strut portion 84 might be challenging to achieve. Alignment guides 250 are provided on the trailer-contacting portion 114 to assist the positioning and the installation of the strut portion 84 on the trailer 20. The trailer-contacting portion 114 incorporates alignment guides 250, embodied as protruding members, located at predetermined locations on the trailer-contacting portion 114 from the skirt panel contacting portion 118 used as reference plane for laterally locating the skirt panel 38. The alignment guides 250 can be seen throughout the Figures using some different configurations of distance and shape. The alignment guides 250 can alternatively be embodies as extrusions molded in the strut portion 84, one or many series of holes for receiving added pins, metallic or not, removable stems, clips or the like without departing from the scope of the present description. One way to facilitate the installation of the securing mechanism 42 is to assemble the connection portion 80 to the strut portion 84 prior to assemble the connection portion 80 with the I-beam 142. Then the securing mechanism 42 can be transversally located along the I-beam 142 and the alignment guides 250 are contacting the interior side of the trailer 20 contour frame 254. The predetermined distance 258 between the alignment guides 250 and the skirt-contacting portion 118, in consideration of the thickness of the contour frame 254. The predetermined distance 258 can be calculated as follows: T−t=d (T=thickness of the contour frame 254; t=thickness of skirt panel 38; d=predetermined distance 258). In some cases, the thickness of the contour frame 254 equals the thickness of skirt panel 38 and the alignment guides 250 will be aligned with the skirt-contacting portion 118 as illustrated in FIG. 29. In some other cases the thickness of the contour frame 254 is larger than the thickness of skirt panel 38 and the alignment guides 250 will be protrude beyond the skirt-contacting portion 118 as illustrated in FIG. 34. In some additional cases the thickness of the contour frame 254 is smaller than the thickness of skirt panel 38 and the alignment guides 250 will be aligned with the skirt-contacting portion 118. The predetermined distance 258 is generally between about 7 mm and about 12 mm. The alignment guides 250 have, for instance, a height of between about 6 mm to about 25 mm.

Figure 26:
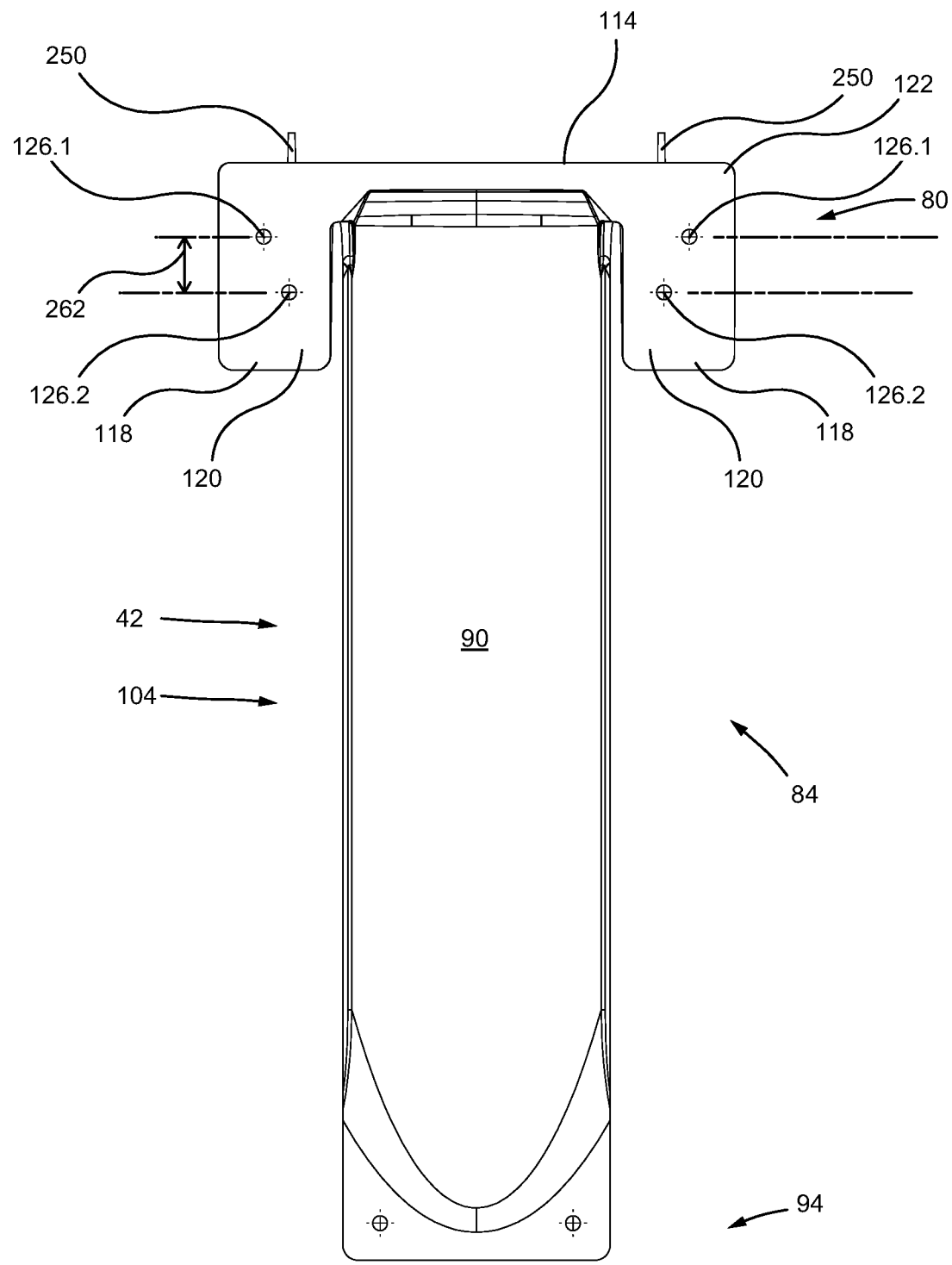
FIG. 26 is a front elevation view of a strut attached to a trailer's floor beam in accordance with at least one embodiment of the invention.
Figure 27:
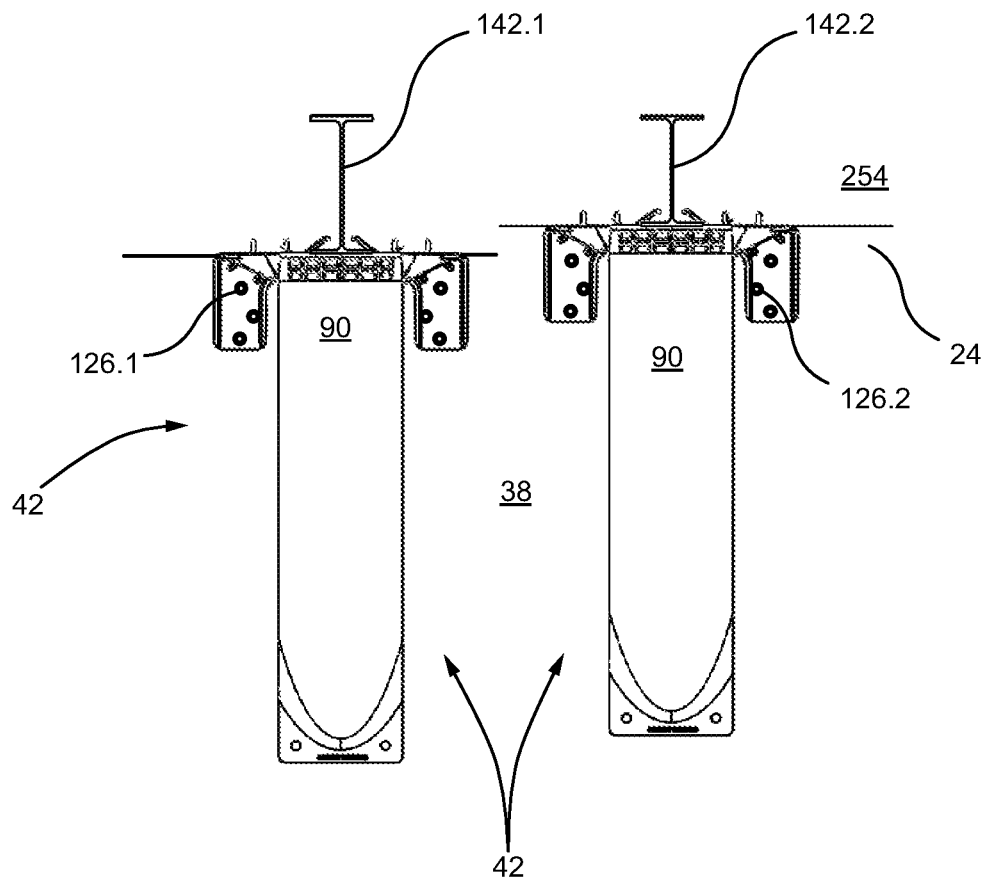
FIG. 27 is a back elevation view of a two struts attached to a trailer's floor beam having two different heights in accordance with at least one embodiment of the invention.
Figure 28:
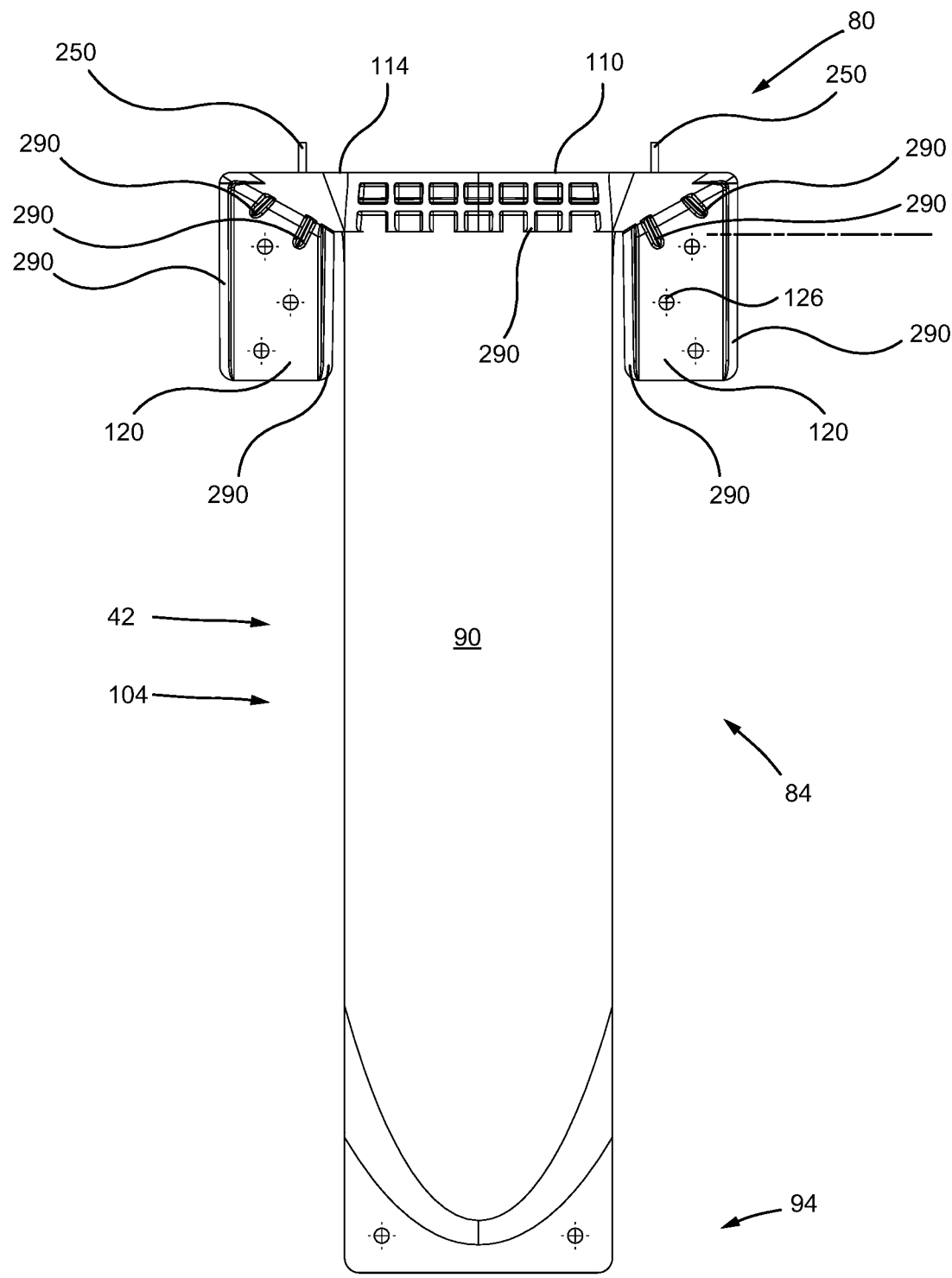
FIG. 28 is a back elevation view of a strut in accordance with at least one embodiment of the invention.

As best seen in FIG. 26, a plurality of sets of holes 126 are provided with a distance 262 variation to accommodate different height of I-beams 142. The I-beam 142 height can be different depending of the trailer 20. Tall I-beams 142.1, as best seen in FIG. 27, can be used to increase the strength of the trailer 20 to maximize the cargo load. For example, the portion of the trailer 20 accommodating the slider rail 24 can require shorter I-beam 142.2 to clear the contour frame 254 of the trailer 20. The higher set of holes 126.1 is going to be used in cooperation with a high I-beam 142.1 while the lower set of holes 126.2 is going to be used in cooperation with a low I-beam 142.2 as depicted in FIG. 26.

Figure 30:
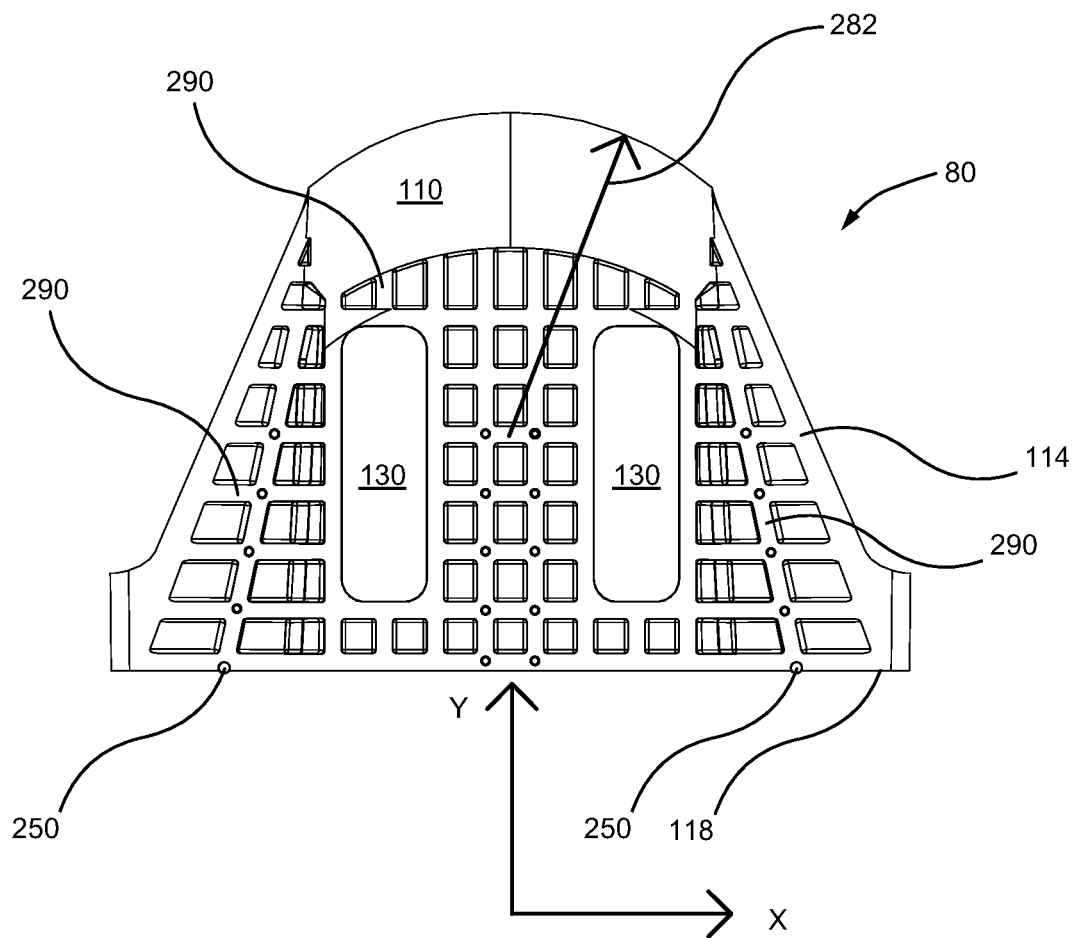
FIG. 30 is a top plan view of a strut in accordance with at least one embodiment of the invention.
Figure 31:
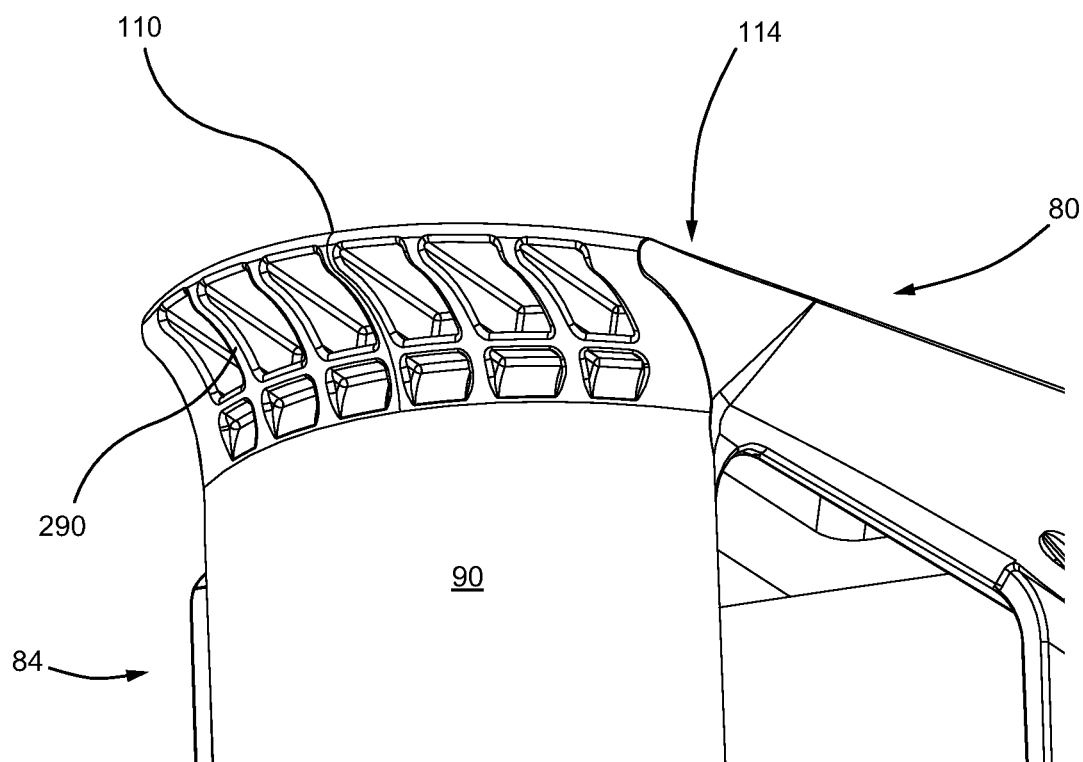
FIG. 31 is a perspective view of a portion of a strut in accordance with at least one embodiment of the invention.
Figure 32:
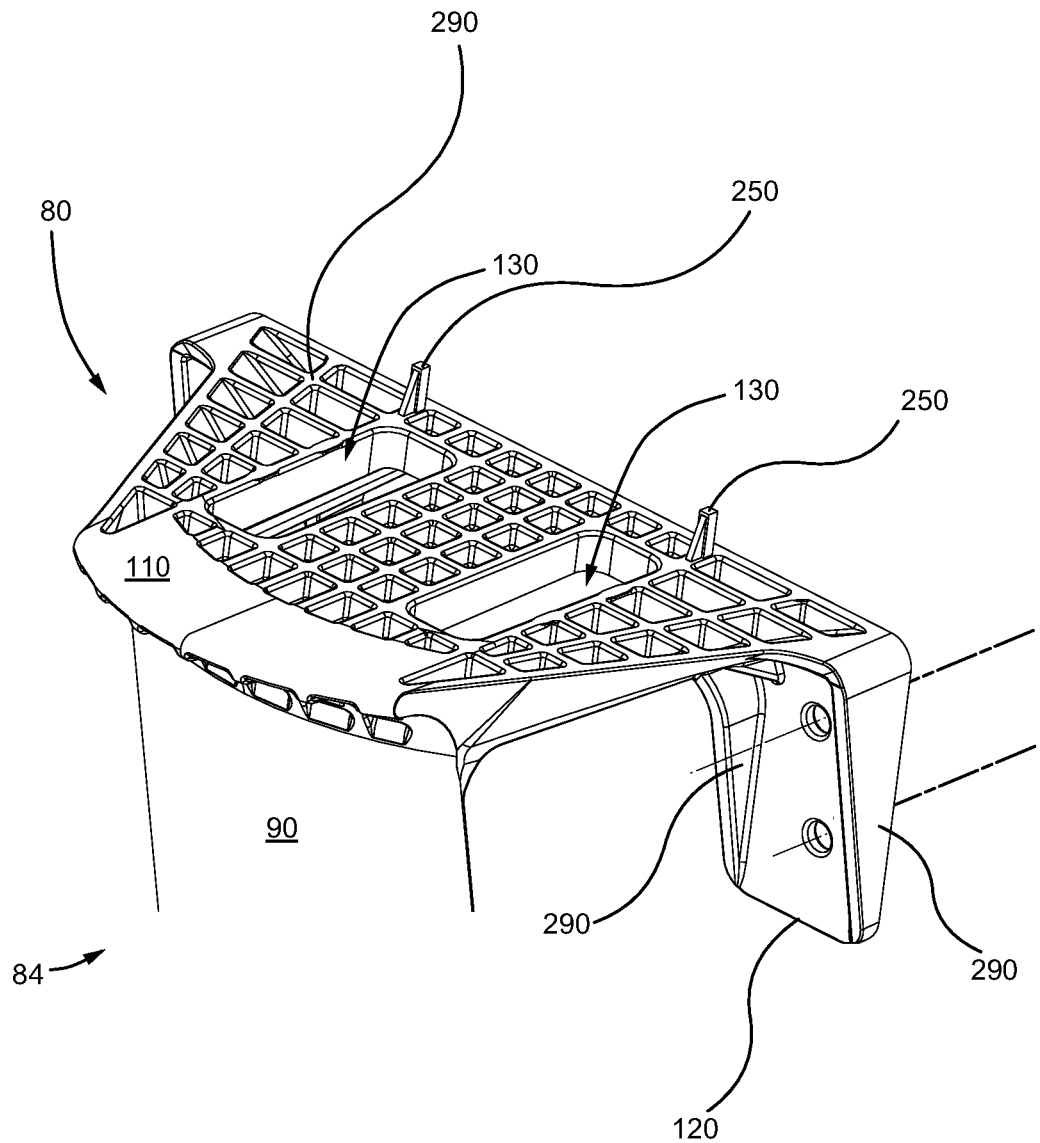
FIG. 32 is a perspective view of a portion of a strut in accordance with at least one embodiment of the invention.
Figure 33:
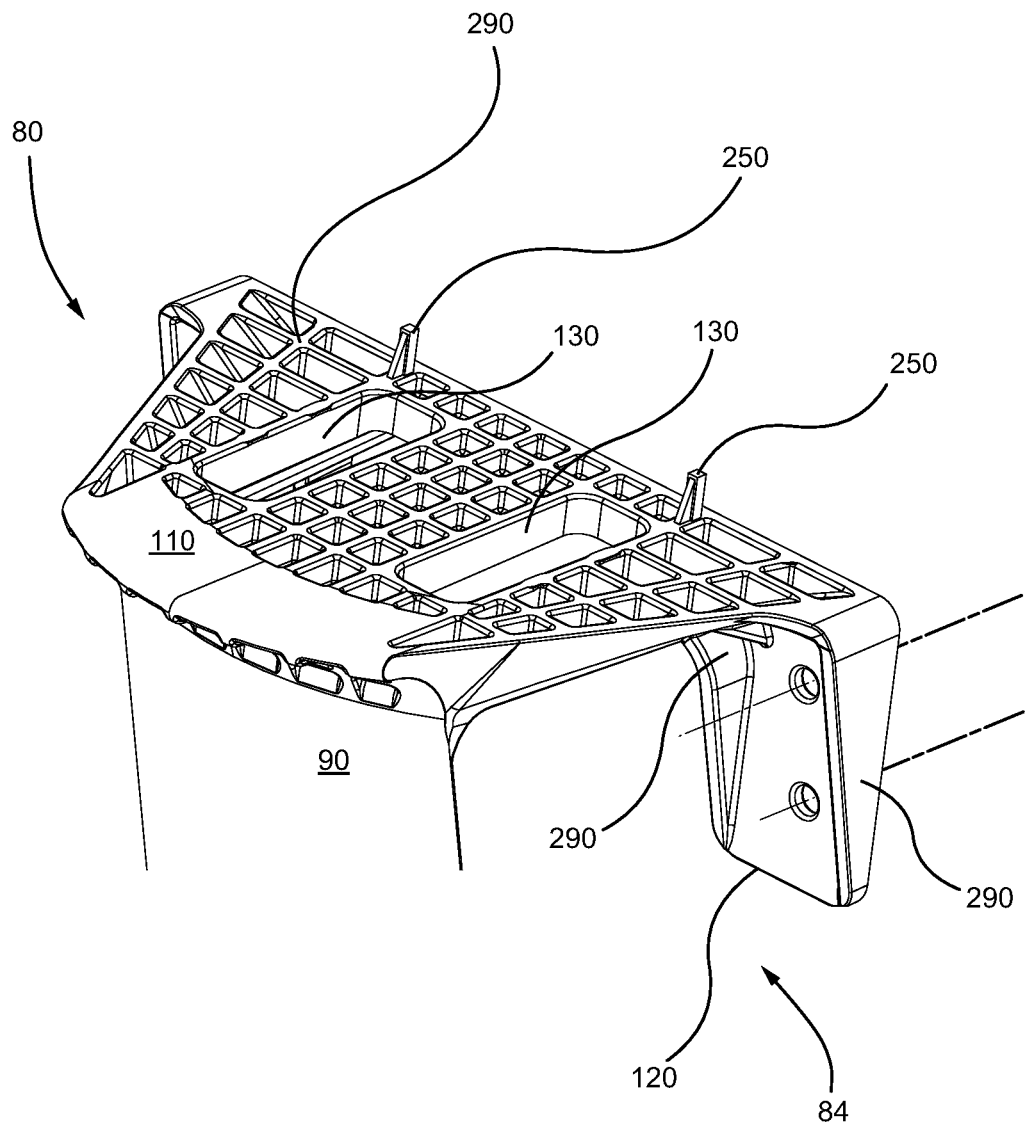
FIG. 33 is a perspective view of a portion of a strut in accordance with at least one embodiment of the invention.

The stabilizer 110 that can be seen in many Figures is an extension of the trailer-contacting portion 114 to extend the contact surface with the I-beam 142 to improve the strength of the upper portion 92 of the strut portion 84. As best seen in FIG. 29, the transversal force 266, and-or the axial force 268, applied to the skirt panel 38 is transmitted to as a moment 270, a normal reaction 274 and/or an axial reaction 278 to the upper portion 92 of the strut portion 84. The stabilizer 110 function as a transfer lever element of the loads acting on the strut member 90 into the I-beam 142 on which the strut portion 84 is installed. In addition, the stress transferred towards the openings 130 locations due to deformation and flexing of the strut portion 84 is reduced by the stabilizer 110. The radius 282 of sweep of the stabilizer 110, illustrated in FIG. 30 and FIG. 31, is following a generally constant radius as the radius of the strut member 90 to optimize its compatibility with the strut member 90. The geometry of the strut member 90 is going to be discussed in further details below. Still referring to FIG. 30, the trailer-contacting portion 114 includes a plurality of reinforcement ribs 290 oriented in different directions, generally orthogonal to each other, to help minimize deformation of the strut portion 84. The deformation in the Y direction is generally due to moment created by the weight of the skirt panel 38 and the stress applied to the strut portion 84 when contacting a foreign object. Ribs 290 in the X direction strengthen the skirt-contacting portion 118 from sagging due to the weight of the skirt panel 38 and the stress applied to the strut portion 84 when contacting a foreign object. The ribs 290 are preferably extending only from one surface, the upper surface or the lower surface, to facilitate the manufacturing process of the part. However, the surface of the stabilizer 110 that is in contact with the I-beam 142 has no ribs 290 to optimize its capacity to sustain significant pressure by spreading it over a larger contact surface and to avoid ribs 290 plastic deformation.

It can be appreciated from FIG. 17 and FIG. 29 that the strut portion 84 is sized and designed to allow connector portion 80 access through an access portion 300 to access the fasteners 138 during installation of the securing mechanism 42. One can appreciate from FIG. 29 the angle θ between the plane 304 where the skirt panel 38 is going to be secured to the strut portion 84 and the axis 308 of the strut member 90. The angle θ is between about 10 degree and about 30 degree. The angle θ is preferably between about 12 degree and about 18 degree. Most preferably, the angle θ is between about 15 degree and about 16 degree depending on the type of use and the type of trailer 20.

Figure 36:
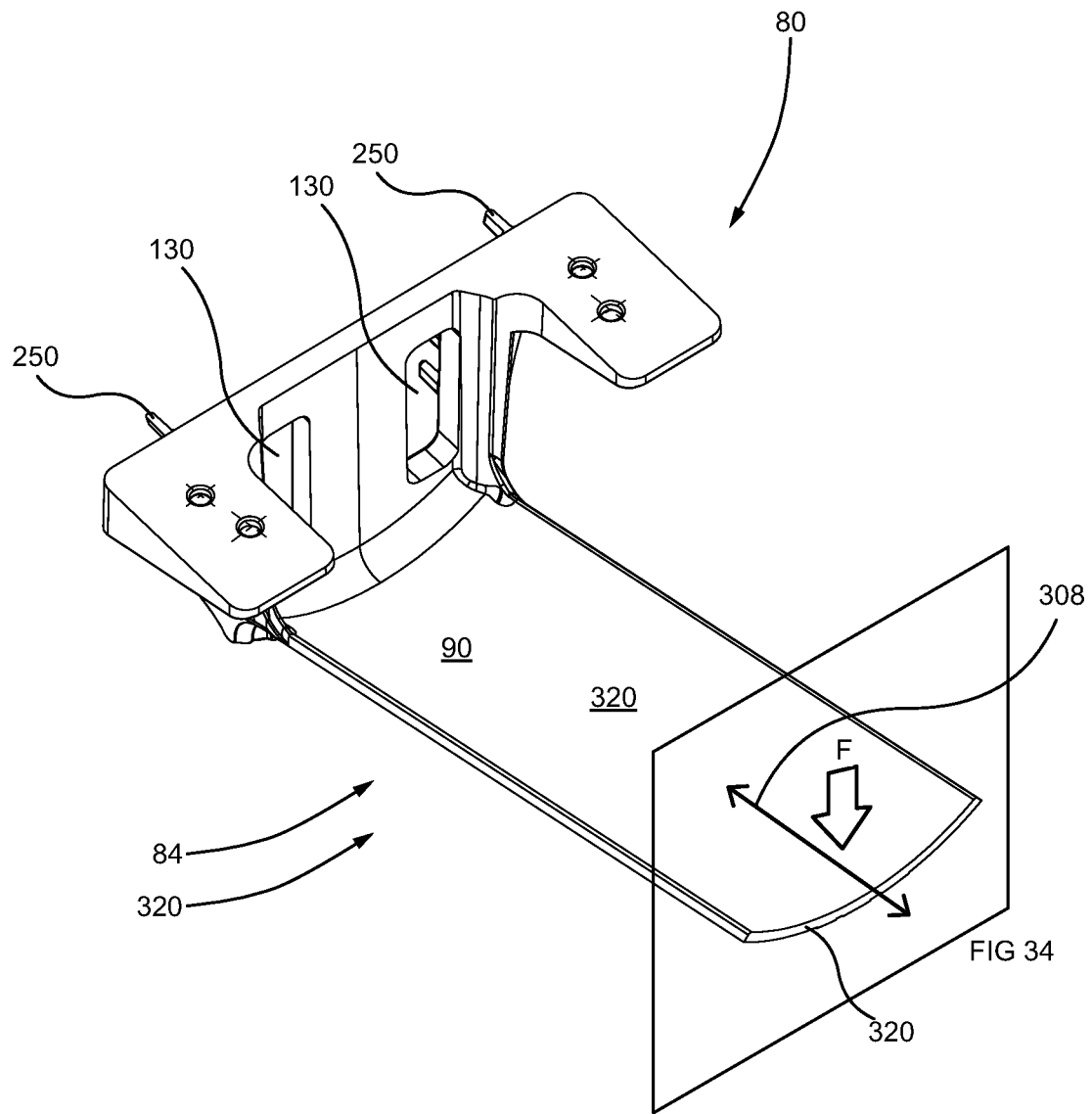
FIG. 36 is a perspective view of a portion of a strut in accordance with at least one embodiment of the invention.
Figure 37:
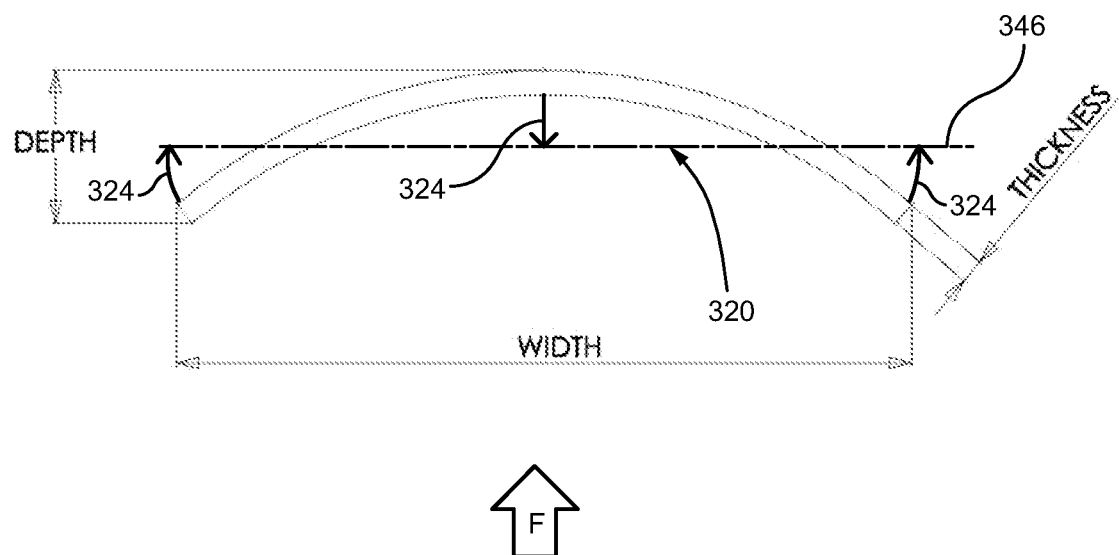
FIG. 37 is a top plan section view of a portion of a strut in accordance with at least one embodiment of the invention.
Figure 38:
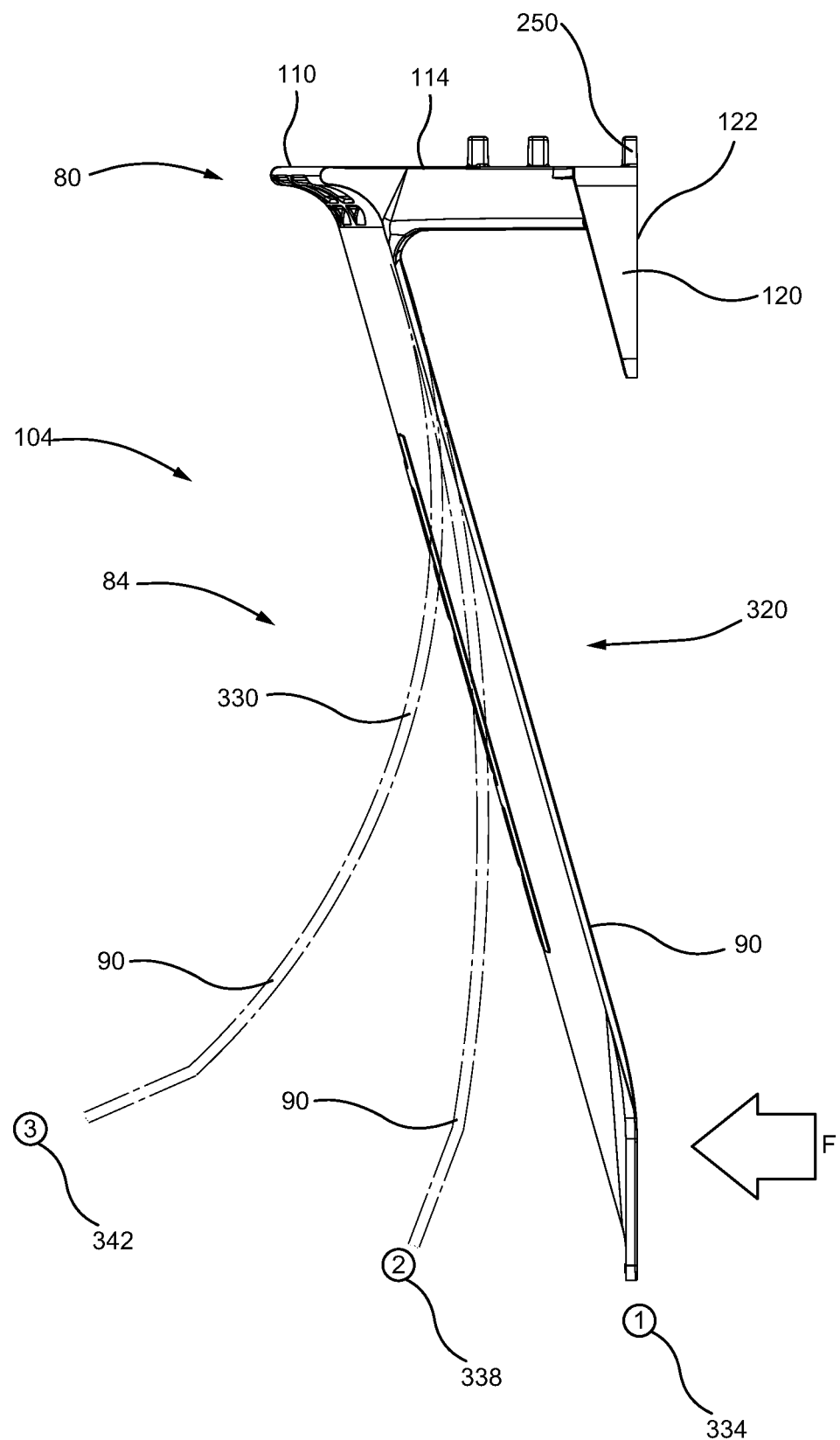
FIG. 38 is a side elevation view of a strut in accordance with at least one embodiment of the invention.
Figure 39:
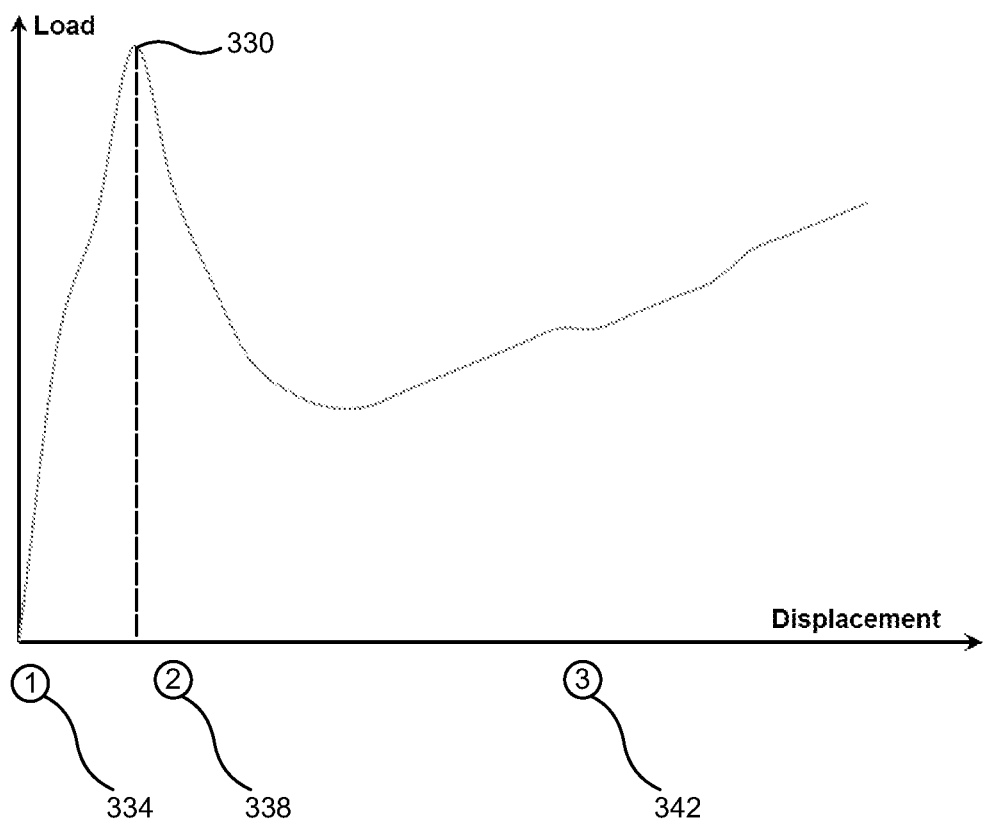
FIG. 39 is a graph illustrating a load vs displacement of a strut in accordance with at least one embodiment of the invention.

A skilled reader would have noticed the shape of the strut member 90 that includes a concave portion 320 (when seen from a side of the trailer 20 toward the trailer 20). The concave portion 320 of the strut portion 90 offers some advantages in the manner the strength of the strut portion 90 is applied to the skirt assembly 30 when an external force, that might be caused by contacting an external object, is applied to the strut portion 84. In light of FIG. 36 throughout FIG. 39, it can be noted that the side of the cavity of the concave portion 320 has an impact on the amount of force required to buckle and bend the strut member 90. It can be appreciated the cavity of the concave portion 320 toward the skirt panel 38 provides more strength when a force is applied toward the trailer 20. In case another behavior requiring a smaller force to bend the strut member 90 is desirable, the concave portion 320 could alternatively be inverted toward the center of the trailer without departing from the scope of the present description. In the present situation where the cavity of the concave portion 320 is located toward the skirt panel 38, a stronger force directed toward the trailer is required to bend the member 90 than if the cavity of the concave portion 320 is in the opposite direction toward the center of the trailer 20. The concave portion 320 is going to change progressively as illustrated in FIG. 37 and the section of the concave portion 320 tends to straighten 346, as illustrated by arrows 324. The resistance of the strut member 90 will be strong until the strut member 90 buckles 330 and flexes more easily after it has buckled as illustrated in FIG. 39. This offers significant advantages by maintaining strongly the skirt panel 38 in an aerodynamically operating configuration 334 that could flex and provide some deflection 338 until a predetermined load is applied that overcome the buckling load threshold 330 of the strut member 90 design. In other words, the strut member 90 is going to be strong and maintain an efficient operating configuration despite the loads applied thereon when the loads are smaller than the buckling load threshold 330 and will become less resistant when buckling and more prone to flex and deflect significantly 342 when the load applied thereon is beyond the buckling load threshold 330. Such a significant load is generally caused by an undesirable event, like a contact with an exterior object, to overcome the object without damaging the aerodynamic skirt assembly 30. The operating configuration 334 position of the strut member 90 is automatically recovered when the load is significantly reduced, or removed. Table A below is in reference with FIG. 37.

TABLE A

| Strut member's | Minimum | Maximum |
|---|---|---|
| Depth A | 5 mm | 25 mm |
| Depth B | 6 mm | 20 mm |
| Depth C | 7 mm | 15 mm |
| Depth D | 8 mm | 12 mm |
| Width A | 50 mm | 180 mm |
| Width B | 60 mm | 160 mm |
| Width C | 70 mm | 140 mm |
| Width D | 80 mm | 120 mm |
| Thickness A | 2 mm | 10 mm |
| Thickness B | 3 mm | 8 mm |
| Thickness C | 4 mm | 7 mm |
| Thickness D | 4.5 mm | 6 mm |

To achieve that, the strut portion 84 can be built from a variety of polymers that are flexible and resilient enough to perform the required flex. Materials such as, but not limited to, polypropylene, nylon, nylon co-polymer, thermoplastic poly olefin, polyethylene, polycarbonate and thermosets, charged with fibers or not, could be used. Alternatively, other material such as metal that are designed to remain in their elastic domain can also be suitable to bend, buckle and automatically recover its original shape. Manufacturing processes including, but not limited to, injection molding, machining, thermoforming and RTM could be used in consideration of the selected material and other constraints.

Figure 40:
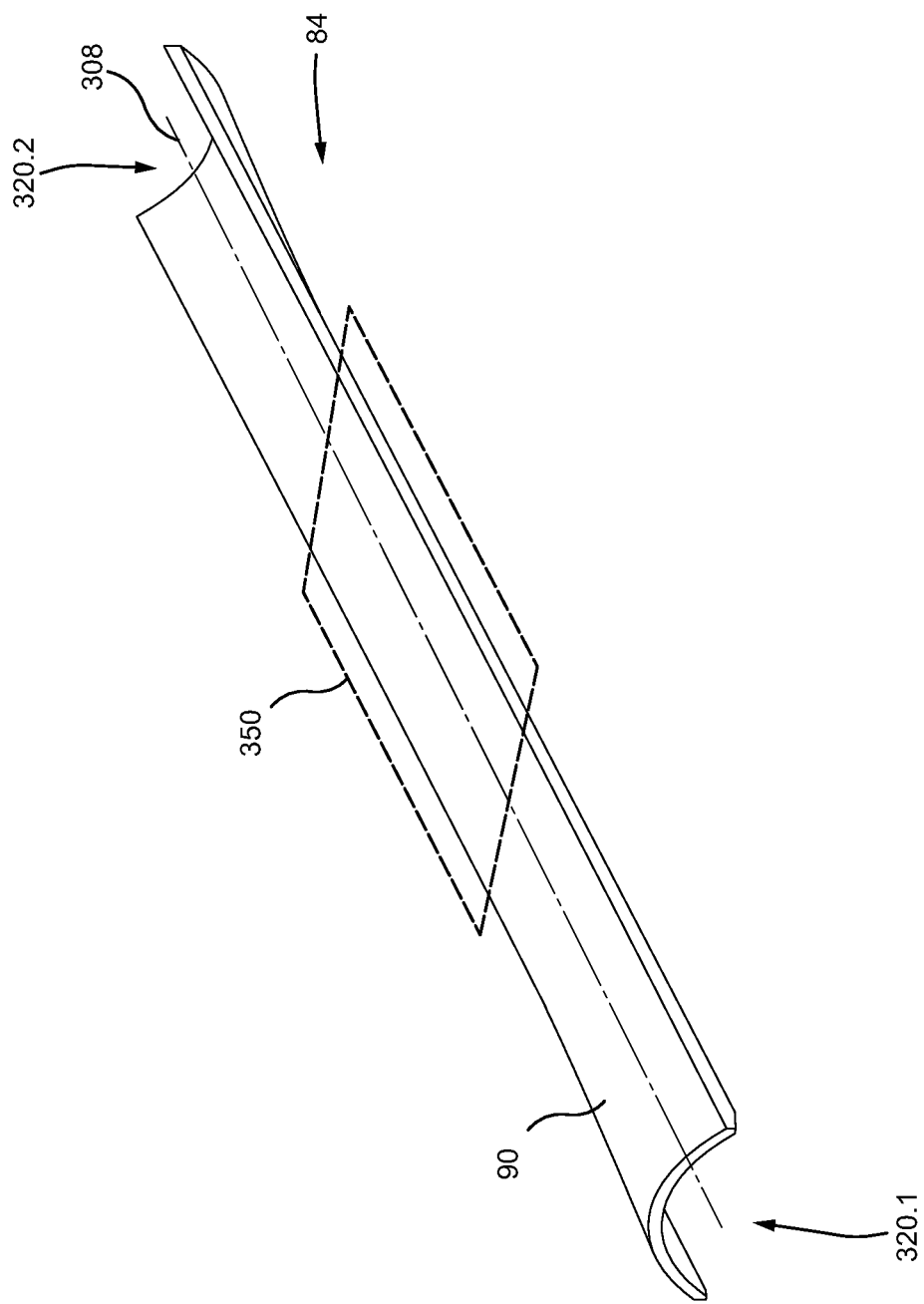
FIG. 40 is a perspective view of a strut in accordance with at least one embodiment of the invention.
Figure 41:
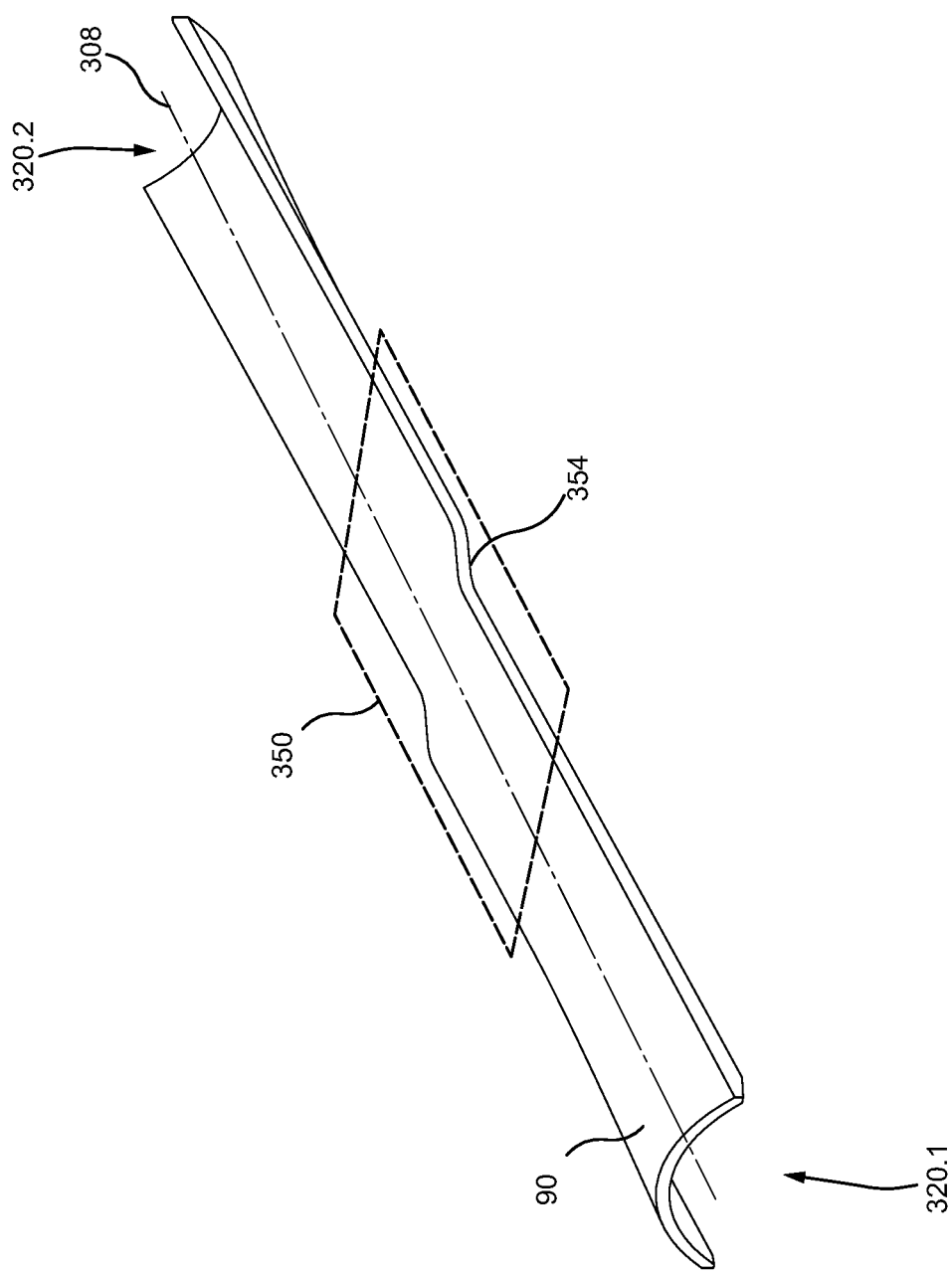
FIG. 41 is a perspective view of a strut in accordance with at least one embodiment of the invention.

An additional embodiment is illustrated in FIG. 40 and FIG. 41. In this embodiment, the strut member 90 includes two concave portions 320.1, 320.2 directed toward opposite directions. A transition portion 350 where the two concave portions 320.1, 320.2 are merging is illustratively located around the middle portion of the strut member 90. The transition portion 350 delimits a portion of the strut member 90 where the flex behavior of the strut member 90 is not within the desired load-supporting range of either of the two concave portions 320.1, 320.2. For instance, the transition portion 350 includes the portion of the strut member 90 that is not concave and offers much less resistance to buckling and bending. The size of the transition portion 350 can vary depending of the particular design of the strut member 90. An advantage of the embodiment illustrated in FIG. 40 and FIG. 41 would be to provide a comparable resistance when the skirt panel 38 sustains a force in the direction of the trailer 20 and a force in the direction opposed to the trailer 20, taking advantages of the location and the direction of the cavities 320.1, 320.2 to allow resiliency behaviors in both directions. FIG. 40 illustrates a rather flat transition portion 350 while FIG. 41 illustrates an alternate design including a transition portion with an offset portion 354 to ensure one edge of each of the two concave portions 320.1, 320.2 are co-linear to help standardizing the behavior of both sides of the strut member 90.

The transition portion 350 can alternatively include reinforcing ribs to prevent bending. Ribs (not illustrated) can be added on each edges of the strut member 90 over the length of the transition portion 350. Additional ribs can be localized over the surface of the transition portion 350. Alternatively, a pair of clamp members (not illustrated) can be added to sandwich the transition portion 350 and secured together with fasteners, for example. The pair of clamp members prevents bending in the region of the strut member 90 that is covered by the pair of clamp members. The design, shape, length and location of the pair of clamp members can be used to modify, adjust and optimize the behavior of the strut portion 84.

While the invention has been described in connection with what is presently considered to be the most practical and preferred embodiments, it is to be understood that the invention is not to be limited to the disclosed embodiments and elements, but, to the contrary, is intended to cover various modifications, combinations of features, equivalent arrangements, and equivalent elements included within the spirit and scope of the appended claims. Furthermore, the dimensions of features of various components that may appear on the drawings are not meant to be limiting, and the size of the components therein can vary from the size that may be portrayed in the figures herein. Thus, it is intended that the present invention covers the modifications and variations of the invention, provided they come within the scope of the appended claims and their equivalents.

The invention claimed is:

1. A strut member for securing an aerodynamic skirt panel thereto and to be mounted to a floor structure of a vehicle, the strut member comprising:
   a vehicle-contacting portion to be secured to the floor structure;
   a top skirt-contacting portion for the aerodynamic skirt panel to be secured thereto;
   a lower skirt-contacting portion for the aerodynamic skirt panel to be secured thereto distant from the top skirt-contact portion; and
   a strut portion connecting the top skirt-contact portion to the lower skirt-contacting portion,
   wherein the strut member provides a clearance in which the skirt panel is free of contact with the strut member between the top skirt-contact portion and the lower skirt-contacting portion when the skirt panel is secured thereto, and wherein the strut portion is configured to resiliently buckle between a buckled position upon the skirt panel undergoing a force exceeding a threshold value toward the strut member and an original position when no force is applied and when the skirt panel is undergoing a force that is less than the threshold value.

2. The strut member of claim 1, wherein the strut portion comprises a first segment having a concave portion facing the aerodynamic skirt panel when assembled to the aerodynamic skirt panel.

3. The strut member of claim 1, wherein the strut portion comprises a portion that is non parallel to the aerodynamic skirt panel when operatively secured thereto.

4. The strut member of claim 1, wherein the strut portion comprises a first segment having two co-planar edges and a curved portion connecting the two co-planar edges.

5. The strut member of claim 1, wherein the top skirt-contacting portion and the lower skirt-contacting portion include co-planar surfaces.

6. The strut member of claim 1, wherein the strut member resiliently buckles when a force of less than 600 Newtons is applied thereto.

7. The strut member of claim 1, wherein the strut member resiliently buckles when a force of between about 400 Newtons and about 600 Newtons is applied thereto.

8. The strut member of claim 1, wherein the lower skirt-contacting portion is for the aerodynamic skirt panel to be non-slidingly secured thereto.

9. The strut member of claim 2, wherein the strut member has a length, and wherein the first segment extends over at least 30 percent of the strut portion.

10. The strut member of claim 1, wherein the strut portion next to the top skirt-contacting portion and next to the lower skirt-contacting portion has a constant width.

11. The strut member of claim 1, wherein the vehicle is a trailer.

12. A strut member for securing an aerodynamic skirt panel thereto and to be mounted to a floor structure of a vehicle, the strut member comprising:
   a vehicle-contacting portion to be secured to the floor structure;
   a top skirt-contacting portion for the aerodynamic skirt panel to be secured thereto;
   a lower skirt-contacting portion for the aerodynamic skirt panel to be secured thereto distant from the top skirt-contacting portion; and
   a strut portion connecting the top skirt-contacting portion to the lower skirt-contacting portion, the strut portion comprising a first segment featuring a concave skirt-facing face adapted to resiliently buckle between a buckled position upon the skirt panel undergoing a force exceeding a threshold value toward the strut member and an original position when no force is applied and when the skirt panel is undergoing a force that is less than the threshold value,
   wherein the first segment of the strut portion is contact-free from the skirt panel when the skirt panel is secured to the strut member.

13. The strut member of claim 12, wherein the first segment further comprises a convex face that is for facing in a direction opposed to the aerodynamic skirt panel.

14. The strut member of claim 12, wherein the strut member provides a clearance in which the skirt panel is free of contact with the strut member between the top skirt-contact portion and the lower skirt-contacting portion.

15. The strut member of claim 12, wherein the top skirt-contacting portion and the lower skirt-contacting portion include co-planar surfaces.

16. The strut member of claim 12, wherein the lower skirt-contacting portion is for the aerodynamic skirt panel to be non-slidingly secured thereto.

17. The strut member of claim 12, wherein the strut portion next to the top skirt-contacting portion and next to the lower skirt-contacting portion has a constant width.

* * * * *

UNITED STATES PATENT AND TRADEMARK OFFICE
CERTIFICATE OF CORRECTION

PATENT NO. : 12,162,539 B2
APPLICATION NO. : 18/377771
DATED : December 10, 2024
INVENTOR(S) : Mathieu Boivin et al.

Page 1 of 1

It is certified that error appears in the above-identified patent and that said Letters Patent is hereby corrected as shown below:

On the Title Page

Abstract, Line 5, Line 6, and Line 9, occurrences of "skirt-contact portion" should read "skirt-contacting portion".

In the Specification

Column 4, Line 33, Line 34, and Line 37, occurrences of "skirt-contact portion" should read "skirt-contacting portion".
Column 5, Line 43, occurrence of "skirt-contact portion" should read "skirt-contacting portion".
Column 14, Lines 29-30, Line 31 and Column 35, occurrences of "skirt-contact portion" should read "skirt-contacting portion".
Column 16, Lines 11-12, occurrence of "skirt-contact portion" should read "skirt-contacting portion".

Signed and Sealed this
Twelfth Day of August, 2025

Coke Morgan Stewart
*Acting Director of the United States Patent and Trademark Office*